US008219392B2

(12) United States Patent
Manjunath et al.

(10) Patent No.: US 8,219,392 B2
(45) Date of Patent: Jul. 10, 2012

(54) SYSTEMS, METHODS, AND APPARATUS FOR DETECTION OF TONAL COMPONENTS EMPLOYING A CODING OPERATION WITH MONOTONE FUNCTION

(75) Inventors: Sharath Manjunath, San Diego, CA (US); Ananthapadmanabhan A. Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1264 days.

(21) Appl. No.: 11/567,052

(22) Filed: Dec. 5, 2006

(65) Prior Publication Data

US 2007/0174052 A1 Jul. 26, 2007

Related U.S. Application Data

(60) Provisional application No. 60/742,846, filed on Dec. 5, 2005.

(51) Int. Cl.
*G10L 19/12* (2006.01)
*G10L 19/00* (2006.01)
*H04J 3/02* (2006.01)

(52) U.S. Cl. ......................... 704/219; 704/222; 370/538

(58) Field of Classification Search .................. 379/386; 704/222, 205
See application file for complete search history.

(56) References Cited

U.S. PATENT DOCUMENTS 4,689,760 A 8/1987 Lee
4,782,523 A * 11/1988 Galand et al. ................ 379/386
4,787,081 A * 11/1988 Waters et al. ................ 370/438
5,311,575 A 5/1994 Oh
5,414,796 A 5/1995 Jacobs
5,727,123 A 3/1998 McDonough
5,749,067 A 5/1998 Barrett
5,765,125 A * 6/1998 Daugherty et al. ........... 704/205
5,784,532 A 7/1998 McDonough
5,845,244 A 12/1998 Proust
5,911,128 A 6/1999 DeJaco
5,915,234 A 6/1999 Itoh
5,937,375 A 8/1999 Nakamura
6,061,647 A 5/2000 Barrett
6,243,672 B1 * 6/2001 Iijima et al. .................. 704/207
6,590,972 B1 7/2003 Lu
6,691,084 B2 2/2004 Manjunath
6,782,095 B1 8/2004 Leong
6,873,701 B1 3/2005 Tian
6,996,523 B1 * 2/2006 Bhaskar et al. ............... 704/222

(Continued)

FOREIGN PATENT DOCUMENTS

JP 6079000 A 3/1994

(Continued)

OTHER PUBLICATIONS

International Search Report13 PCT/US06/061631—International Search Authority—European Patent Office—Dec. 6, 2007.

(Continued)

*Primary Examiner* — David R Hudspeth
*Assistant Examiner* — Farzad Kazeminezhad
(74) *Attorney, Agent, or Firm* — Alexander C. Chen; Espartaco Diaz Hidalgo

(57) ABSTRACT

Systems, methods, and apparatus for the detection of signals having spectral peaks with narrow bandwidth are described herein. The range of described configurations includes implementations that perform such detection using parameters of a linear prediction coding (LPC) analysis scheme.

38 Claims, 22 Drawing Sheets

U.S. PATENT DOCUMENTS

| | | | |
|---|---|---|---|
| 2003/0033145 | A1 | 2/2003 | Petrushin |
| 2004/0148168 | A1 | 7/2004 | Fingscheidt |
| 2004/0267522 | A1 | 12/2004 | Allamanche |
| 2005/0159942 | A1 | 7/2005 | Singhal |
| 2006/0041426 | A1 | 2/2006 | Ojanpera |

FOREIGN PATENT DOCUMENTS

| | | | |
|---|---|---|---|
| JP | 8506434 | T | 7/1996 |
| JP | 9503874 | T | 4/1997 |
| JP | 2001007704 | A | 1/2001 |
| JP | 2001500640 | T | 1/2001 |
| JP | 2001175298 | A | 6/2001 |

OTHER PUBLICATIONS

Written Opinion, PCT/US2006/061631, International Searching Authority, European Patent Office, Dec. 6, 2007.

International Preliminary Report on Patentability, PCT/US2006/061631, The International Bureau of WIPO, Geneva, Switzerland, Jun. 11, 2008.

So, Stephen. Efficient Block Quantisation for Image and Speech Coding. PhD thesis, Griffith Univ., Brisbane, AU, Mar. 2005. Cover and sec. 5.2 (pp. 196-205).

Varho, Susanna. New linear predictive methods for digital speech processing. PhD thesis, Helsinki Univ. of Tech., Espoo, FI, 2001. Cover (3 pp.) and chap. 2 (pp. 21-36).

* cited by examiner

FIG. 4a
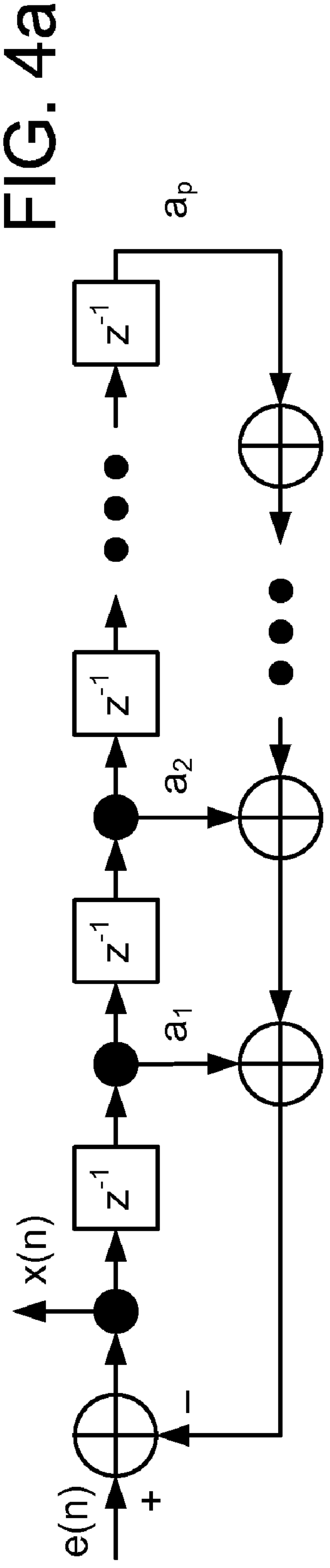
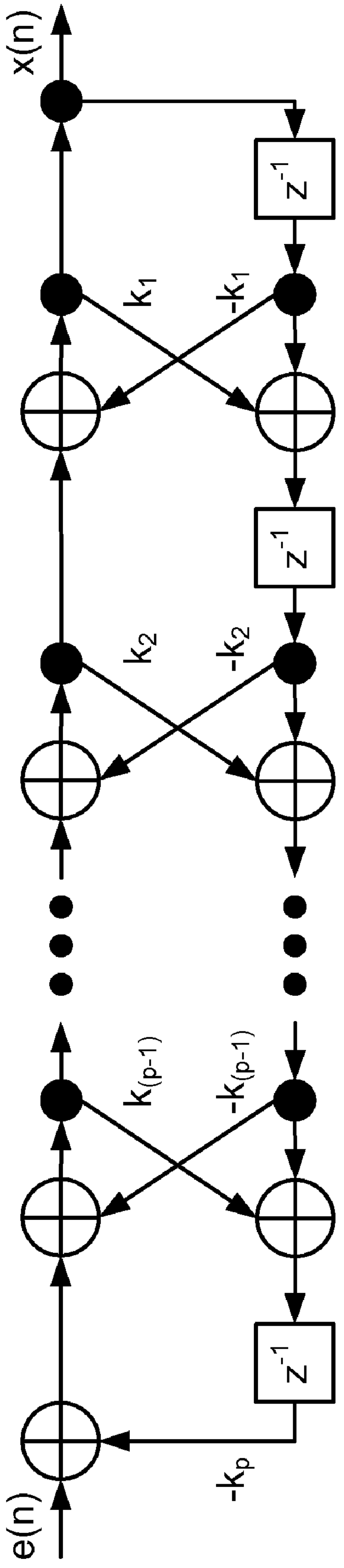
FIG. 4b

```
for (m=1; m <= p; m++) {
    EP(m) = R(m);
    EN(m) = R(m-1);
}

for (h = 0; ; h++) {
    k(h+1) = -EP(h+1) / EN(1);
    E(h) = EN(1);
    EN(1) += k(h+1) * EP(h+1);

    if (h == p-1) break;

    for (m = h+2; m < p; m++) {
        EX = EP(m) + k(h+1)*EN(m-h);
        EN(m-h) += k(h+1) * EP(m);
        EP(m) = EX;
    }
}
```

FIG. 6

```
for (m = 1; m <= p; m++) {
    EP(m) = R(m);
    EN(m) = R(m-1);
}

for (h = 0; ; h++) {
    k(h+1) = -EP(h+1) / EN(1);
    E(h) = EN(1);
    EN(1) += k(h+1) * EP(h+1);
    G(h+1) = E(0) / EN(1);

    if (h == p-1) break;

    for (m = h+2; m < p; m++) {
        EX = EP(m) + k(h+1)*EN(m-h);
        EN(m-h) += k(h+1) * EP(m);
        EP(m) = EX;
    }
}
```

FIG. 7

```
for (m = 1; m <= p; m++) { EP(m) = R(m); EN(m) = R(m-1); }

for (j = 1; j <= q; j++) { S_update(j) = 1; S(j) = 0; }

for (h = 0; ; h++) {
     k(h+1) = -EP(h+1) / EN(1);
     E(h) = EN(1);
     EN(1) += k(h+1) * EP(h+1);
     G(h+1) = E(0) / EN(1);

     for (j = 1; j <= q; j++) {
          if (S_update(j)) {
               S(j)++;
               if (G(h+1) > T(j)) S_update(j) = 0;
          }
     }

     if (h == p-1) break;

     for (m = h+2; m < p; m++) {
          EX = EP(m) + k(h+1)*EN(m-h);
          EN(m-h) += k(h+1) * EP(m);
          EP(m) = EX;
     }
}
```

FIG. 10

SYSTEMS, METHODS, AND APPARATUS FOR DETECTION OF TONAL COMPONENTS EMPLOYING A CODING OPERATION WITH MONOTONE FUNCTION

RELATED APPLICATIONS

This application claims benefit of U.S. Provisional Pat. Appl. No. 60/742,846, entitled "DETECTION OF NARROWBAND SIGNALS USING LPC ANALYSIS," filed Dec. 5, 2005.

FIELD

This disclosure relates to signal processing.

BACKGROUND

Transmission of voice by digital techniques has become widespread, particularly in long distance telephony, packet-switched telephony such as Voice over IP (VoIP), and digital radio telephony such as cellular telephony. Such proliferation has created interest in determining the least amount of information that can be sent over a channel while maintaining the perceived quality of the reconstructed speech. If speech is transmitted by simply sampling and digitizing, a data rate on the order of sixty-four kilobits per second (kbps) may be required to achieve a speech quality comparable to that of a conventional analog wireline telephone. However, through the use of speech analysis, followed by the appropriate coding, transmission, and resynthesis at the receiver, a significant reduction in the data rate can be achieved.

Devices that are configured to compress speech by extracting parameters that relate to a model of human speech generation are called "speech coders." A speech coder typically includes an encoder and a decoder. The encoder divides the incoming speech signal into blocks of time (or "frames"), analyzes each frame to extract certain relevant parameters, and quantizes the parameters into a binary representation, such as a set of bits or a binary data packet. The data packets are transmitted over the communication channel (i.e., a wired or wireless network connection) to a receiver including a decoder. The decoder receives and processes data packets, unquantizes them to produce the parameters, and recreates speech frames using the unquantized parameters.

The function of the speech coder is to compress the digitized speech signal into a low-bit-rate signal by removing natural redundancies that are inherent in speech. The digital compression is achieved by representing the input speech frame with a set of parameters and employing quantization to represent the parameters with a set of bits. If the input speech frame has a number of bits $N_i$, and the corresponding data packet produced by the speech coder has a number of bits $N_o$, the compression factor achieved by the speech coder is $C_r=N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the information content of the speech signal, to provide a target voice quality, with a small set of parameters for each frame.

Speech coders may be implemented as time-domain coders, which attempt to capture the time-domain speech waveform by employing high-time-resolution processing to encode small segments of speech (typically five-millisecond (ms) subframes) at a time. For each subframe, a high-precision representative from a codebook space is found by means of various search algorithms known in the art. Alternatively, speech coders may be implemented as frequency-domain coders, which perform an analysis process to capture the short-term speech spectrum of the input speech frame with a set of parameters and employ a corresponding synthesis process to recreate the speech waveform from the spectral parameters. The parameter quantizer preserves the parameters by representing them with stored representations of code vectors in accordance with known quantization techniques, such as those described in A. Gersho & R. M. Gray, Vector Quantization and Signal Compression (1992).

A well-known time-domain speech coder is the Code Excited Linear Predictive (CELP) coder. One example of such a coder is described in L. B. Rabiner & R. W. Schafer, Digital Processing of Speech Signals 396-453 (1978). In a CELP coder, the short-term correlations, or redundancies, in the speech signal are removed by a linear prediction (LP) analysis, which finds the coefficients of a short-term formant filter. Applying the short-term prediction filter to the incoming speech frame generates an LP residue signal, which is further modeled and quantized with long-term prediction filter parameters and a subsequent stochastic codebook. Thus, CELP coding divides the task of encoding the time-domain speech waveform into the separate tasks of encoding of the LP short-term filter coefficients and encoding the LP residue. Time-domain coding can be performed at a fixed rate (i.e., using the same number of bits $N_o$ for each frame) or at a variable rate (in which different bit rates are used for different types of frame contents). Variable-rate coders attempt to use only the amount of bits needed to encode the codec parameters to a level adequate to obtain a target quality. An exemplary variable-rate CELP coder is described in U.S. Pat. No. 5,414,796 (Jacobs et al., issued May 9, 1995).

Time-domain coders such as the CELP coder typically rely upon a high number of bits $N_o$ per frame to preserve the accuracy of the time-domain speech waveform. Such coders typically deliver excellent voice quality, provided the number of bits $N_o$ per frame is relatively large (e.g., 8 kbps or above), and are successfully deployed in higher-rate commercial applications. However, at low bit rates (4 kbps and below), a time-domain coder may fail to retain high quality and robust performance due to the limited number of available bits. For example, the limited codebook space available at a low bit rate may clip the waveform-matching capability of a conventional time-domain coder.

A speech coder may be configured to select a particular coding mode and/or rate according to one or more qualities of the signal to be encoded. For example, a speech coder may be configured to distinguish frames containing speech from frames containing non-speech signals, such as signaling tones, and to use different coding modes to encode the speech and non-speech frames.

SUMMARY

A method of signal processing according to one configuration includes performing a coding operation on a portion in time of a digitized audio signal, wherein the coding operation includes an ordered plurality of iterations. This method includes calculating, at each of the ordered plurality of iterations, a value of a measure relating to a gain of the coding operation. In one example, the coding operation is an iterative procedure for calculating parameters of a linear prediction coding model. This method includes determining, for each of a first plurality of threshold values, the iteration among the ordered plurality at which a change occurs in a state of a first relation between the calculated value and a first threshold value, and storing an indication of the iteration. This method includes comparing at least one of the stored indications to at least a corresponding one of a second plurality of threshold values.

An apparatus for signal processing according to another configuration includes means for performing a coding operation on a portion in time of a digitized audio signal, wherein the coding operation includes an ordered plurality of iterations. This apparatus includes means for calculating, at each of the ordered plurality of iterations, a value of a measure relating to a gain of the coding operation. This apparatus includes means for determining, for each of a first plurality of threshold values, the iteration among the ordered plurality at which a change occurs in a state of a first relation between the calculated value and the threshold value and for storing an indication of the iteration. This apparatus includes means for comparing at least one of the stored indications to at least a corresponding one of a second plurality of threshold values.

An apparatus for signal processing according to a further configuration includes a coefficient calculator configured to perform a coding operation to calculate a plurality of coefficients based on a portion in time of a digitized audio signal, wherein the coding operation includes an ordered plurality of iterations. This apparatus includes a gain measure calculator configured to calculate, at each of the ordered plurality of iterations, a value of a measure relating to a gain of the coding operation. The apparatus includes a first comparison unit configured to determine, for each of a first plurality of threshold values, the iteration among the ordered plurality at which a change occurs in a state of a first relation between the calculated value and the threshold value and to store an indication of the iteration. The apparatus includes a second comparison unit configured to compare at least one of the stored indications to at least a corresponding one of a second plurality of threshold values.

BRIEF DESCRIPTION OF THE DRAWINGS

FIG. 4A shows a schematic diagram for a direct-form realization of a synthesis filter.

FIG. 4B shows a schematic diagram for a lattice realization of a synthesis filter.

FIG. 6 shows a pseudocode listing for an implementation of the Leroux-Gueguen algorithm.

FIG. 7 shows a pseudocode listing including implementations of tasks T100 and T200.

FIG. 10 shows a pseudocode listing including implementations of tasks T100, T200, and T300.

DETAILED DESCRIPTION

Systems, methods, and apparatus for the detection of signals having spectral peaks with narrow bandwidth (also called "tonal components" or "tones") are described herein. The range of described configurations includes implementations which perform such detection using parameters of a linear prediction coding (LPC) analysis scheme as is typically already used in speech coders, thereby reducing computational complexity as opposed to an approach that uses a separate tone detector.

Unless expressly limited by its context, the term "calculating" is used herein to indicate any of its ordinary meanings, such as computing, generating, and selecting from a list of values. Where the term "comprising" is used in the present description and claims, it does not exclude other elements or operations. The term "A is based on B" is used to indicate any of its ordinary meanings, including the cases (i) "A is equal to B" and (ii) "A is based on at least B."

Examples of tones include special signals often encountered in telephony, such as call-progress tones (e.g., a ring-back tone, a busy signal, a number unavailable tone, a facsimile protocol tone, or other signaling tone). Other examples of tonal components are dual-tone multifrequency (DTMF) signals, which include one frequency from the set {697 Hz, 770 Hz, 852 Hz, 941 Hz} and one frequency from the set {1209 Hz, 1336 Hz, 1477 Hz, 1633 Hz}. Such DTMF signals are commonly used for touch-tone signaling. It is also common for a user to use a keypad to generate DTMF tones during a telephone call to interact with an automated system at the other end of the call, such as a voice-mail system or other system having an automated selection mechanism such as a menu.

Figure 1:
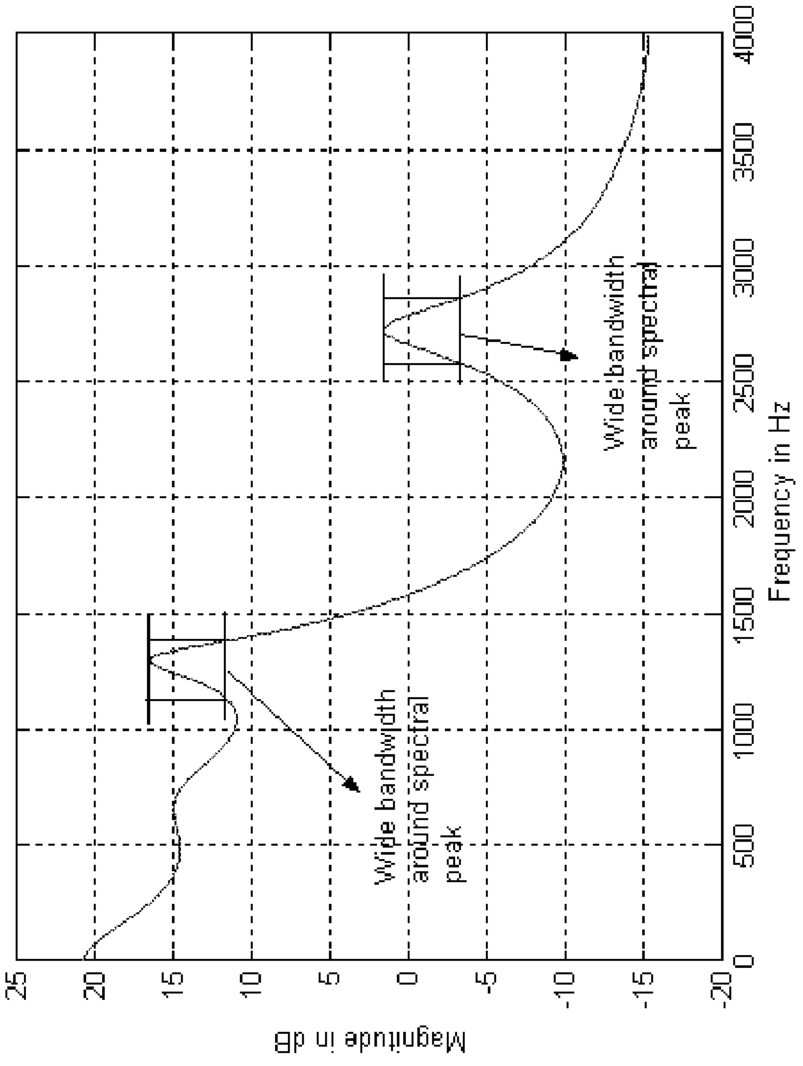
FIG. 1 shows an example of a spectrum of a speech signal.
Figure 2:
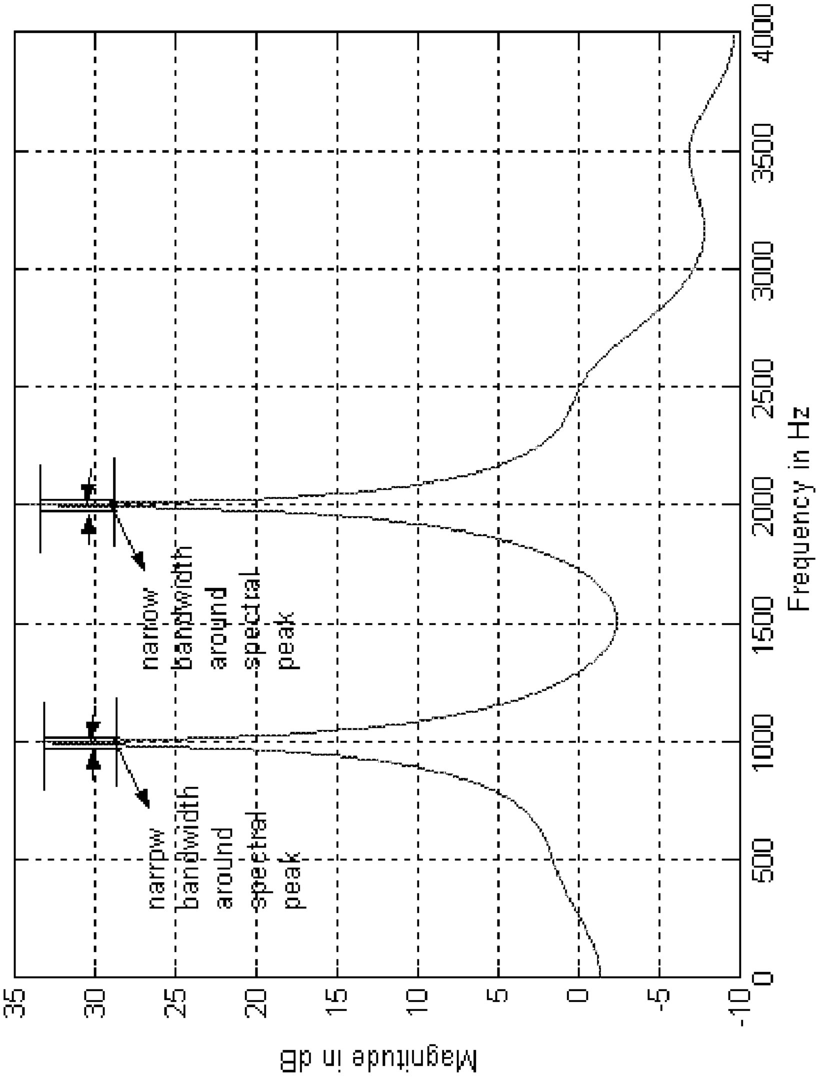
FIG. 2 shows an example of a spectrum of a tonal signal.

In general, we define a tonal signal as a signal containing very few (e.g., fewer than eight) tones. The spectral envelope of a tonal signal has sharp peaks at the frequencies of these tones, where the bandwidth of the spectral envelope around such a peak (as shown in the example of FIG. 2) is much smaller than the bandwidth of the spectral envelope around a typical peak in a speech signal (as shown in the example of FIG. 1). For example, the 3-dB bandwidth of a peak corresponding to a tonal component may be less than 100 Hz and may be less than 50 Hz, 20 Hz, 10 Hz, or even 5 Hz.

It may be desirable to detect whether the signal input to a speech coder is a tonal signal as opposed to some type of speech signal. Tonal signals normally do not pass through a speech coder very well, especially at low bit rates, and the result after decoding typically does not sound like the tones at all. The spectral envelopes of tonal signals differ from those of speech signals, and the traditional classification processes of speech codecs may fail to select a suitable encoding mode for frames containing tonal components. Therefore it may be desirable to detect a tonal signal so that an appropriate mode may be used to encode it.

For example, some speech codecs use a noise-excited linear prediction (NELP) mode to encode unvoiced frames. While a NELP mode may be suitable for waveforms that resemble noise, such a mode is likely to produce a poor result if used to encode a tonal signal. Waveform interpolation (WI) modes, which include prototype waveform interpolation (PWI) and prototype pitch period (PPP) modes, are well suited for encoding waveforms that have a strong periodic component. As compared to another coding mode at the same rate, however, a NELP or WI mode may produce a poor result if used to encode a signal having two or more tonal components, such as one including a DTMF signal. The use of such coding modes at low bit rates (such as half-rate (e.g., 4 kbps), quarter-rate (e.g., 2 kbps), or less), which may be desirable to increase system capacity, is likely to produce even worse performance for tonal signals. It may be desirable to use a coding mode that is more generally applicable, such as a code-excited linear prediction (CELP) mode or a sinusoidal speech coding mode, to encode a tonal signal.

It may also be desirable to control the rate at which a tonal signal is encoded. Such control may be especially desirable in a variable-rate speech coder that chooses one from among a plurality of rates to code the input frame. For example, in order to achieve high-quality reproduction of a special signal such as a ringback or DTMF tone, a variable-rate speech codec may be configured to use the highest possible rate, or a substantially high rate, or a special coding mode to code a signal in which the presence of at least one tone has been detected.

Problems may arise when a linear predictive coding (LPC) scheme is performed on a tonal signal. For example, the strong spectral peaks of a tonal signal may render the corresponding LPC filter unstable, may complicate conversion of the LPC coefficients to another form for transmission (such as line spectral pairs, line spectral frequencies, or immittance spectral pairs), and/or may reduce quantization efficiency. Therefore, it may be desirable to detect a tonal signal so that the LPC scheme may be modified (e.g., by zeroing parameters of the LPC model that are above a particular order).

Figure 3:
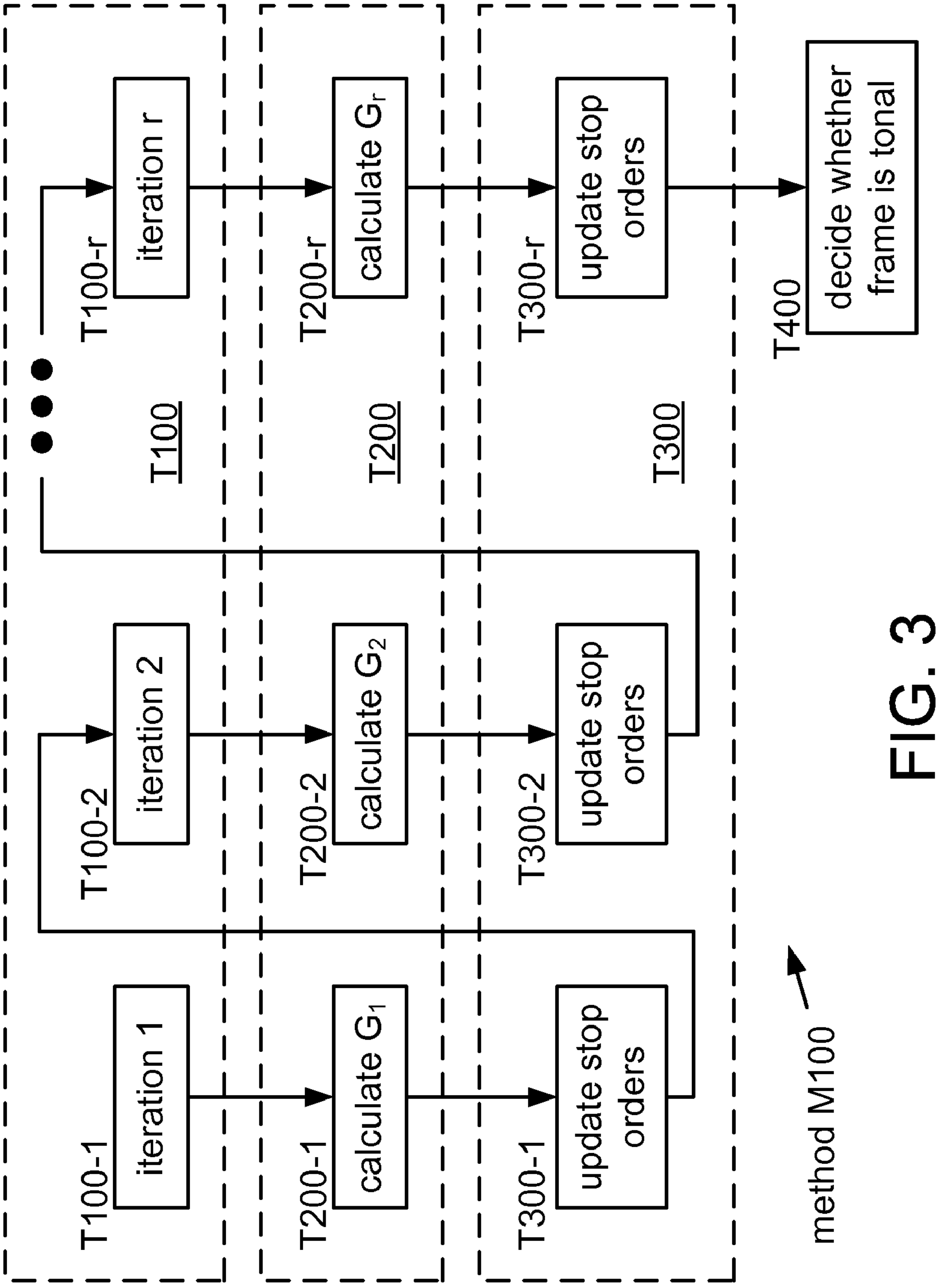
FIG. 3 shows a flowchart for a method M100 according to a disclosed configuration.

FIG. 3 shows a flowchart for a method M100 according to a disclosed configuration. Task T100 performs an iterative coding operation, such as an LPC analysis, on a portion in time of a digitized audio signal (where T100-*i* indicates the i-th iteration, and r indicates the number of iterations). The portion in time, or "frame," is typically selected to be short enough that the spectral envelope of the signal may be expected to remain relatively stationary. One typical frame length is 20 milliseconds, which corresponds to 160 samples at a typical sampling rate of 8 kHz, although any frame length or sampling rate deemed suitable for the particular application may be used. In some applications, the frames are nonoverlapping, while in other applications, an overlapping frame scheme is used. In one example of an overlapping frame scheme, each frame is expanded to include samples from the adjacent previous and future frames. In another example, each frame is expanded only to include samples from the adjacent previous frame. In the particular examples described below, a nonoverlapping frame scheme is assumed.

A linear prediction coding (LPC) scheme models a signal to be encoded s as a sum of an excitation signal u and a linear combination of p past samples in the signal, as in the following expression:

$$s[n] = \sum_{i=1}^{p} a_i s[n-i] + Gu[n].$$

where G denotes a gain factor for the input signal s, and n denotes a sample or time index. According to such a scheme, the input signal s may be modeled as an excitation source signal u driving an all-pole (or autoregressive) filter of order p having the following form:

$$H(z) = \frac{1}{1 - \sum_{i=1}^{p} a_i z^{-i}}. \quad (1)$$

For each portion in time (e.g., frame) of the input signal, task T100 extracts a set of model parameters that estimate the long-term spectral envelope of the signal. Typically such extraction is performed at a rate of 50 frames per second. Information characterizing these parameters is transferred in some form to a decoder, possibly with other data such as information characterizing the excitation signal u, where it is used to recreate the input signal s.

The order p of the LPC model may be any value deemed suitable for the particular application, such as 4, 6, 8, 10, 12, 16, 20 or 24. In some configurations, task T100 is configured to extract the model parameters as a set of p filter coefficients $a_i$. At the decoder, these coefficients may be used to implement a synthesis filter according to a direct-form realization as shown in FIG. 4A. Alternatively, task T100 may be configured to extract the model parameters as a set of p reflection coefficients $k_i$, which may be used at the decoder to implement a synthesis filter according to a lattice realization as shown in FIG. 4B. The direct-form realization typically is simpler and has a lower computational cost, but LPC filter coefficients are less robust to rounding and quantization errors than reflection coefficients, such that a lattice realization may be preferred in a system using fixed-point computation or otherwise having limited precision. (It should be noted that in some descriptions in the art, the signs of the model parameters are inverted in expression (1) above and in the implementations shown in FIGS. 4A and 4B.)

An encoder is typically configured to transmit the model parameters across a transmission channel in quantized form. The LPC filter coefficients are not bounded and may have a large dynamic range, and it is typical to convert these coefficients to another form before quantization, such as line spectral pairs (LSPs), line spectral frequencies (LSFs), or immittance spectral pairs (ISPs). Other operations, such as perceptual weighting, may also be performed on the model parameters before conversion and/or quantization.

It may also be desirable for the encoder to transmit information regarding the excitation signal u. Some coders detect and transmit the fundamental frequency or period of a voiced speech signal, such that the decoder uses an impulse train at that frequency as an excitation for the voiced speech signal and a random noise excitation for unvoiced speech signals. Other coders or coding modes use the filter coefficients to extract the excitation signal u at the encoder and encode the excitation using one or more codebooks. For example, a CELP coding mode typically uses a fixed codebook and an adaptive codebook to model the excitation signal, such that the excitation signal is commonly encoded as an index for the fixed codebook and an index for the adaptive codebook. It may be desirable to use such a CELP coding mode to transmit a tonal signal.

Task T100 may be configured according to any of the various known iterative coding operations for calculating LPC model parameters such as filter and/or reflection coefficients. Such coding operations are typically configured to solve expression (1) iteratively by computing a set of coefficients that minimizes a mean square error. An operation of this type may generally be classified as an autocorrelation method or a covariance method.

An autocorrelation method computes the set of filter coefficients and/or reflection coefficients starting from values of the autocorrelation function of the input signal. Such a coding operation typically includes an initialization task in which a windowing function w[n] is applied to the portion in time (e.g., the frame) to zero the signal outside the portion. It may be desirable to use a tapered windowing function having low sample weights at each end of the window, which may help to reduce the effect of components outside the window. For example, it may be desirable to use a raised cosine window, such as the following Hamming window function:

$$w[n] = \begin{cases} 0.54 - 0.46\cos\frac{2\pi n}{N-1}, & 0 \le n \le N-1 \\ 0, & \text{elsewhere} \end{cases}$$

where N is the number of samples in the portion in time.

Other tapered windows that may be used include the Hanning, Blackman, Kaiser, and Bartlett windows. The windowed portion $s_w[n]$ may be calculated according to an expression such as the following:

$$s_w[n]=s[n]w[n];\ 0 \leqq n \leqq N-1.$$

The windowing function need not be symmetric, such that one half of the window may be weighted differently than the other half. A hybrid window may also be used, such as a Hamming-cosine window or a window having two halves of different windows (for example, two Hamming windows of different sizes).

Values of the autocorrelation function of the portion in time may be calculated according to an expression such as the following:

$$R(m) = \sum_{i=0}^{N-1-m} s_w[i]s_w[i+m],\ 0 \le m \le (p-1).$$

It may also be desirable to perform one or more preprocessing operations on the autocorrelation values before computing the iterations. For example, the autocorrelation values R(m) may be spectrally smoothed by performing an operation such as the following:

$$R_w(m) = \begin{cases} 1.00003\ R(m), & m = 0; \\ e^{\left[\frac{1}{2}\left(\frac{40\pi m}{8000}\right)^2\right]} R(m), & 1 \le m \le (p-1). \end{cases}$$

Preprocessing of the autocorrelation values may also include normalizing the values (e.g., with respect to the value R(0), which indicates the total energy of the portion in time).

An autocorrelation method of calculating LPC model parameters involves performing an iterative process to solve an equation that includes a Toeplitz matrix. In some implementations of an autocorrelation method, task T100 is configured to perform a series of iterations according to any of the well-known recursive algorithms of Levinson and/or Durbin for solving such equations. As shown in the following pseudocode listing, such an algorithm produces the filter coefficients $a_i$ as the values $a_i^{(p)}$ for $1 \leqq i \leqq p$, using the reflection coefficients $k_i$ as intermediates:

$$E_0 = R(0); \qquad (2)$$
for(i = 1; i ≦ p; i ++) {
$$k_i = \left[R(i) - \sum_{j=1}^{i-1} a_j^{(i-1)} R(i-j)\right] \Big/ E_{i-1};$$
$$a_i^{(i)} = k_i;$$
$$\text{for}(j = 1;\ j < i;\ j{+}{+})\ a_j^{(i)} = a_j^{(i-1)} - k_i a_{i-j}^{(i-1)};$$
$$E_i = (1 - k_i^2)E_{i-1};$$
} where the input autocorrelation values may be preprocessed as described above.

Figure 5:
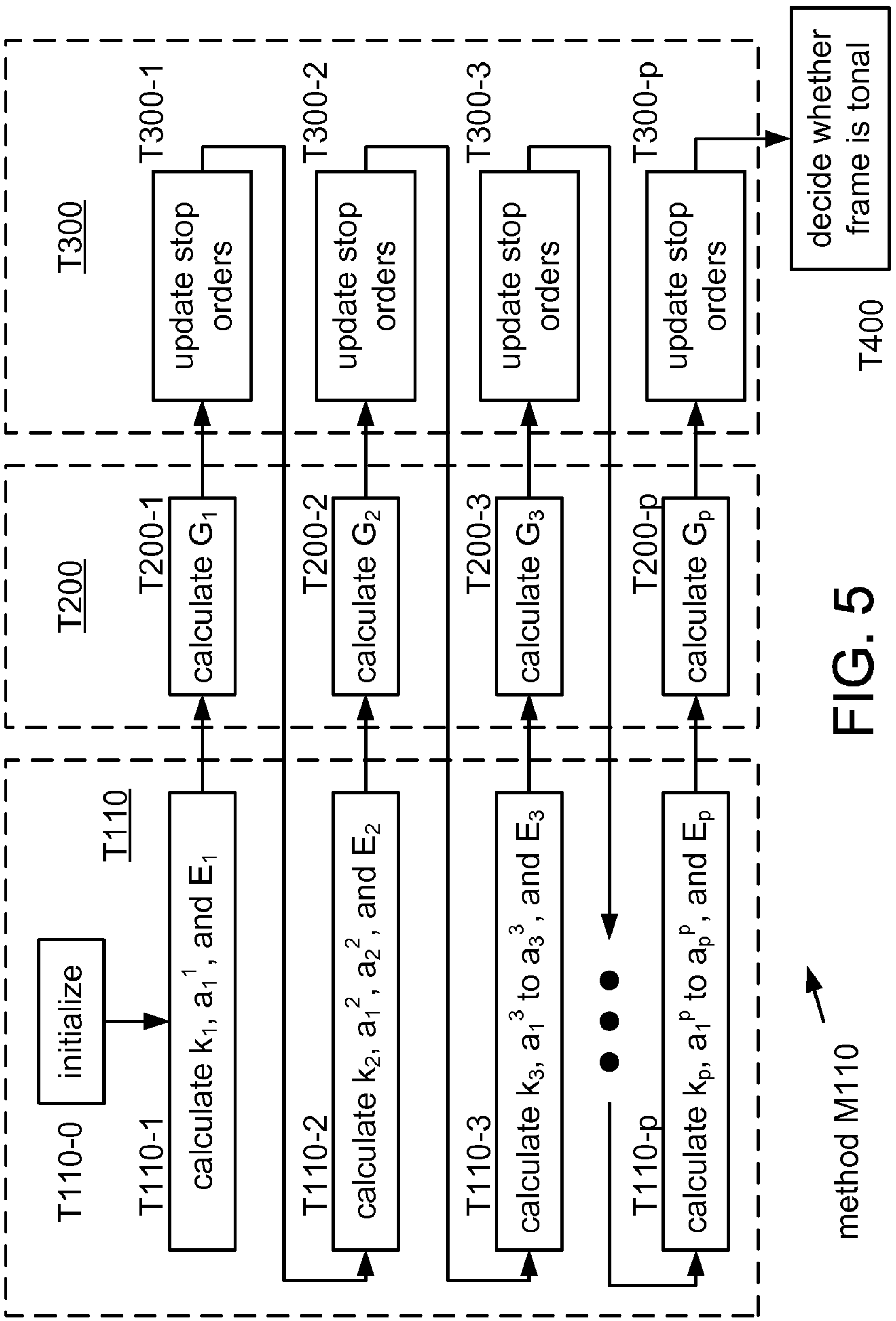
FIG. 5 shows a flowchart for an implementation M110 of method M100.

The term $E_i$ indicates the energy of the error (or residue) remaining after iteration i. As the series of iterations executes, the residual energy is progressively reduced such that $E_i \leqq E_{i-1}$, FIG. 5 shows a flowchart for an implementation M110 of method M100 that includes an implementation T110 of task T100 configured to perform calculations of $k_i$, $a_i$, and $E_i$ according to an algorithm as described above, where T110-0 indicates one or more initialization and/or preprocessing tasks as described herein such as windowing of the frame, computation of the autocorrelation values, spectral smoothing of the autocorrelation values, etc.

In other implementations of an autocorrelation method, task T100 is configured to perform a series of iterations to calculate the reflection coefficients $k_i$ (also called partial correlation (PARCOR) coefficients, negative PARCOR coefficients, or Schur-Szego parameters) rather than the filter coefficients $a_i$. One algorithm that may be used in task T100 to obtain the reflection coefficients is the Leroux-Gueguen algorithm, which uses impulse response estimates e as intermediaries and is expressed in the following pseudocode listing:

```
for(i = -(p - 1); i ≦ p; i ++) e0(i) = R(i);                (3)
for(m = 1; m ≦ p; m ++) {
    km = -em-1(m)/em-1(0);
    for(i = -(p - 1) + m; i ≦ p; i ++)
        em(i) = em-1(i) + km em-1(m - i);
}
```

The Leroux-Gueguen algorithm is usually implemented using two arrays EP, EN in place of the arrays e. FIG. 6 shows a pseudocode listing for one such implementation that includes calculation of an error (or residual energy) term E(h) at each iteration. Other well-known iterative methods that may be used to obtain the reflection coefficients $k_i$ from the autocorrelation values include the Schur recursive algorithm, which may be configured for efficient parallel computation.

As mentioned above, the reflection coefficients may be used to implement a lattice realization of the synthesis filter.

Alternatively, the LPC filter coefficients may be obtained from the reflection coefficients via a recursion as shown in the following pseudocode listing:

$$
\begin{aligned}
&\text{for}(i = 1;\ i \leqq p;\ i\text{++})\ \{\\
&\quad a_i^{(i)} = k_i;\\
&\quad \text{for}(j = 1;\ j \leqq i;\ j\text{++})\ a_j^{(8i)} = a_j^{(i-1)} + k_i a_{i-j}^{(i-1)};\\
&\}
\end{aligned}
$$

Covariance methods are another class of coding operations that may be used in task T100 to iteratively calculate a set of coefficients to minimize a mean square error. A covariance method starts from values of the covariance function of the input signal and typically applies an analysis window to the error signal rather than to the input speech signal. In this case, the matrix equation to be solved includes a symmetric positive definite matrix rather than a Toeplitz matrix, so that the Levinson-Durbin and Leroux-Gueguen algorithms are not available, but Cholesky decomposition may be used to solve for the filter coefficients $a_i$ in an efficient manner. While a covariance method may preserve high spectral resolution, however, it does not guarantee stability of the resulting filter. The use of covariance methods is less common than the use of autocorrelation methods.

For each of some or all of the iterations of the coding operation, task T200 calculates a corresponding value of a measure relating to a gain of the coding operation. It may be desirable to calculate the gain measure as a ratio between a measure of the initial signal energy (e.g., the energy of the windowed frame) and a measure of the energy of the current residual. In one such example, the gain measure $G_i$ for iteration i is calculated according to the following expression:

$$G_i = \frac{E_0}{E_i}.$$

In this case, the factor $G_i$ represents the LPC prediction gain of the coding operation thus far. The prediction gain may also be computed from the reflection coefficients $k_i$ according to the following expression:

$$G_i = \frac{1}{\prod_{j=1}^{i}(1 - k_j^2)}.$$

In another such example, it may be desirable to calculate the gain measure $G_i$ to represent the current LPC prediction error, as in the following expressions:

$$G_i = \frac{E_i}{E_0} \text{ or } G_i = \prod_{j=1}^{i}(1 - k_j^2).$$

The gain measure $G_i$ may also be calculated according to other expressions that, for example, also include the product $$\prod_{j=1}^{i}(1 - k_j^2),$$

or a ratio between $E_0$ and $E_i$, as a factor or term. The gain measure $G_i$ may be expressed on a linear scale or in another domain, such as on a logarithmic scale (e.g., log $E_0/E_i$ or log $E_i/E_0$). Further implementations of task T200 calculate the gain measure based on a change in the residual energy (e.g., $G_i = \Delta E_i = E_i - E_{i-1}$).

Typically the gain measure $G_i$ is calculated at each iteration (e.g., tasks T200-*i* as shown in FIGS. 3 and 5), although it is also possible to implement task T200 such that the gain measure $G_i$ is calculated only at every other iteration, or every third iteration, etc. The following pseudocode listing shows one example of a modification of pseudocode listing (2) above that may be used to perform implementations of both of tasks T100 and T200:

$$
\begin{aligned}
&E_0 = R(0); \qquad (4)\\
&\text{for}(i = 1;\ i \leqq p;\ i\text{++})\ \{\\
&\quad k_i = \left[R(i) - \sum_{j=1}^{i-1} a_j^{(i-1)} R(i-j)\right] \Big/ E_{i-1};\\
&\quad a_i^{(i)} = k_i;\\
&\quad \text{for}(j = 1;\ j < i;\ j\text{++})\ a_j^{(i)} = a_j^{(i-1)} - k_i a_{i-j}^{(i-1)};\\
&\quad E_i = (1 - k_i^2) E_{i-1};\\
&\quad G_i = E_0/E_i;\\
&\}
\end{aligned}
$$

FIG. 7 shows one example of a modification of the pseudocode listing in FIG. 6 that may be used to perform implementations of both of tasks T100 and T200.

When one or more tones are present in the signal being analyzed, the residual energy may fall rapidly between two of the iterations. Task T300 determines and records an indication of the first iteration at which a change occurs in a state of a relation between the value of the gain measure and a threshold value T. For a case in which the gain measure is calculated as $E_0/E_i$, for example, task T300 may be configured to record an indication of the first iteration at which a state of the relation "$G_i > T$" (or "$G_i \geqq T$") changes from false to true or, equivalently, at which a state of the relation "$G_i \leqq T$" (or "$G_i < T$") changes from true to false. For a case in which the gain measure is calculated as $E_i/E_0$, for example, task T300 may be configured to record an indication of the first iteration at which a state of the relation "$G_i > T$" (or "$G_i \geqq T$") changes from true to false or, equivalently, at which a state of the relation "$G_i \leqq T$" (or "$G_i < T$") changes from false to true.

The stored indication of the first iteration at which the relevant state change occurs is also called a "stop order," and the operation of determining whether the relevant state change has occurred is also called "updating the stop order." A stop order may store the index value i of the target iteration or may store some other indication of the index value i. It is assumed herein that task T300 is configured to initialize each stop order to a default value of zero, although configurations are also expressly contemplated and hereby disclosed in which task T300 is configured to initialize each stop order to some other default value (e.g., p), or in which the state of a respective update flag is used to indicate whether the stop order holds a valid value. In the latter type of configuration of task T300, for example, if the state of an update flag has been changed to prevent further updating, then it is assumed that the corresponding stop order holds a valid value.

Task T300 may be configured to maintain more than one stop order (e.g., two or more). That is to say, task T300 may be configured to determine, for each of a plurality of q different thresholds $T_j$ (where $1 \leqq j \leqq q$), the first iteration at which a change occurs in a state of a relation between the value of the gain measure and the threshold value $T_j$, and to store an indication of the iteration (e.g., to a corresponding memory location). For a configuration in which $G_i$ increases monotonically with i (e.g., $G_i = E_0/E_i$), it may be desirable to arrange the thresholds in a progression such that $T_j < T_{j+1}$. For a configuration in which $G_i$ decreases monotonically with i (e.g., $G_i = E_i/E_0$), it may be desirable to arrange the thresholds in a progression such that $T_j > T_{j+1}$. In a particular example, task T300 is configured to maintain three stop orders. One example of a set of thresholds $T_j$ that may be used in such a case is $T_1$=6.8 dB, $T_2$=8.1 dB, and $T_3$=8.6 dB (e.g., for $G_i = E_0/E_i$). Another example of a set of thresholds $T_j$ that may be used in such a case is $T_1$=15 dB, $T_2$=20 dB, and $T_3$=30 dB (e.g., for $G_i = E_0/E_i$).

Task T300 may be configured to update the stop order(s) each time task T200 calculates a value for the gain measure $G_i$ (e.g., at each iteration of task T100), such that the stop orders are current when the series of iterations is completed. Alternatively, task T300 may be configured to update the stop order(s) after the series of iterations has completed, e.g., by iteratively processing gain measure values $G_i$ of the respective iterations that have been recorded by task T200.

Figure 8:
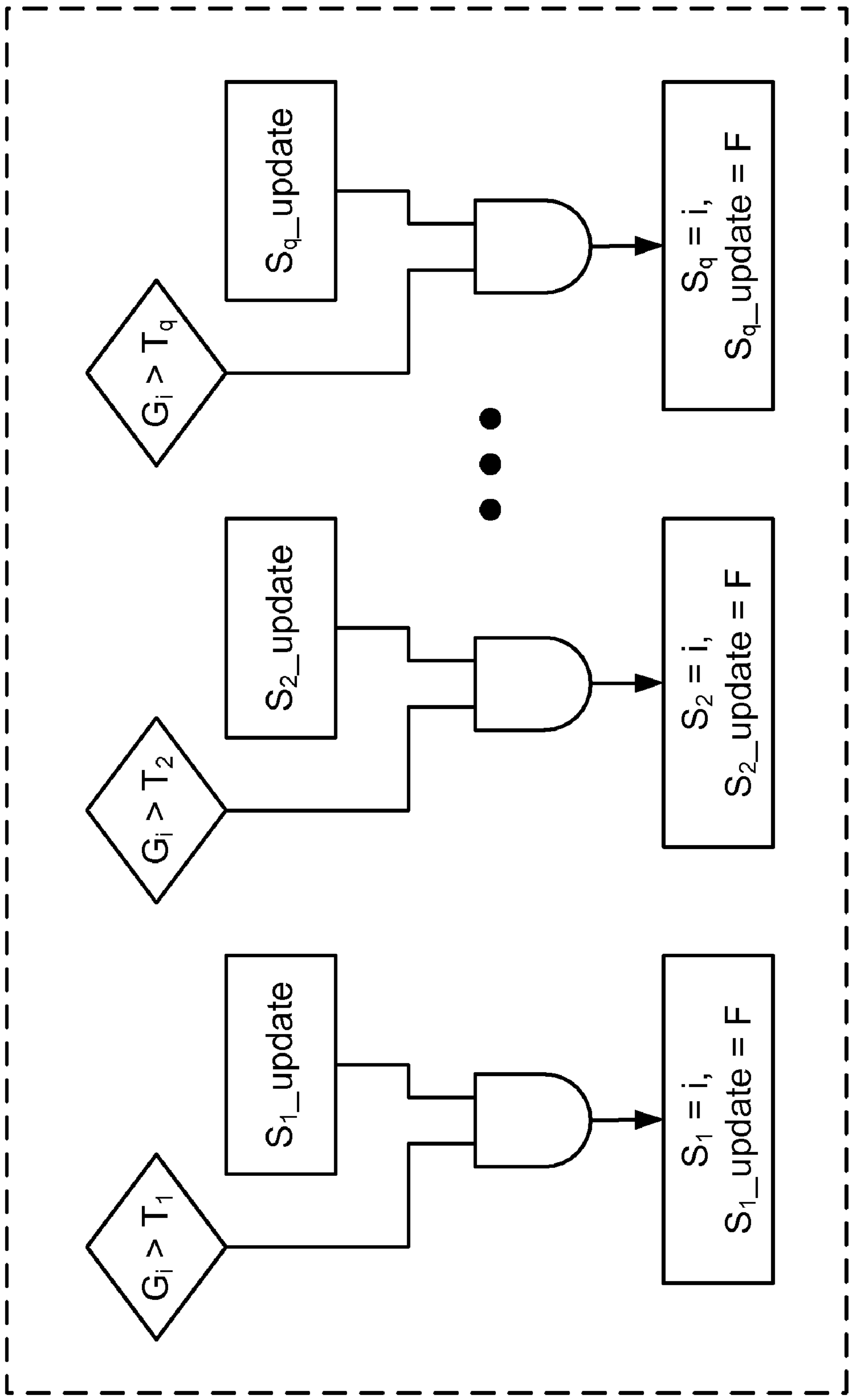
FIG. 8 shows an example of a logic structure for task T300.

FIG. 8 shows an example of a logic structure that may be used by task T300 to update some number q of stop orders serially and/or in parallel. In this example, each module j of the structure determines whether the gain measure is greater than (alternatively, not less than) a corresponding threshold value $T_j$ for the stop order $S_j$. If this result is true, and the update flag for the stop order is also true, then the stop order is updated to indicate the index of the iteration, and the state of the update flag is changed to prevent further updating of the stop order.

Figure 9B:
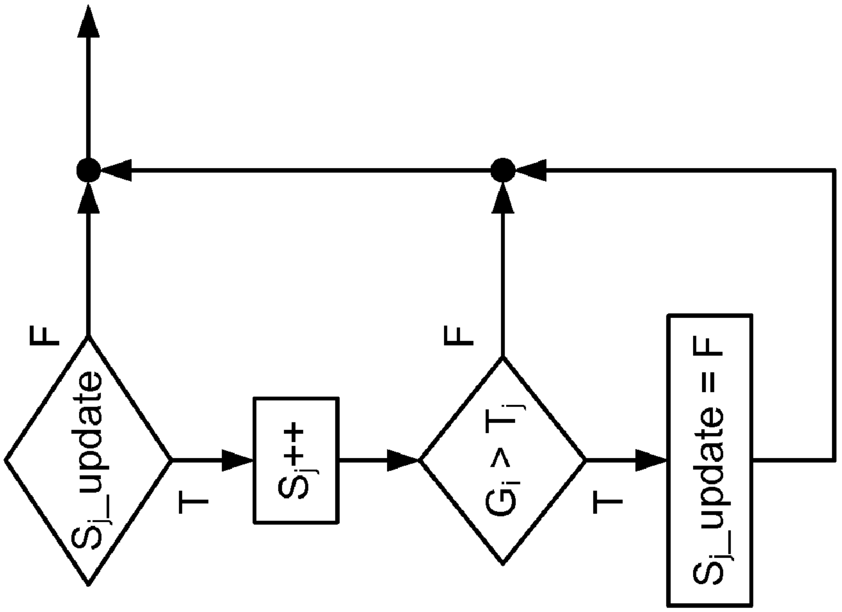
FIGS. 9A and 9B show examples of flowcharts for task T300.
Figure 9A:
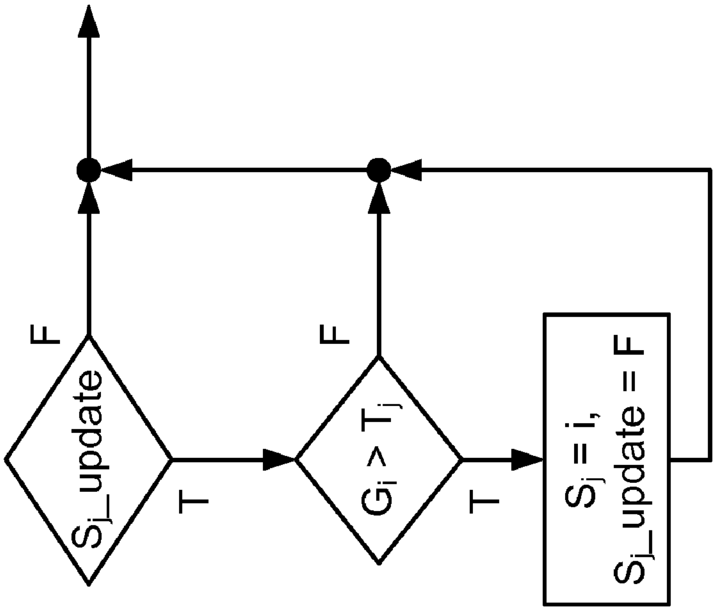

FIGS. 9A and 9B show examples of flowcharts that may be replicated in alternate implementations of task T300 to update each of a set of stop orders in a serial and/or parallel fashion. In these examples, the state of the relation is evaluated only if the respective update flag is still true. In the example of FIG. 9B, the stop order is incremented at each iteration until the threshold $T_j$ is reached (alternatively, exceeded) by the gain measure $G_i$, at which point task T300 disables further incrementing of the stop order by changing the state of the update flag.

The following pseudocode listing shows one example of a modification of pseudocode listing (4) above that may be used to perform implementations of all of tasks T100, T200, and T300:

(5)

$E_0 = R(0);$
$\text{for}(j = 1;\ j \leqq q;\ j{+}{+})\ \{\ S\_update(j) = 1;\ S_j = 0;\ \}$
$\text{for}(i = 1;\ i \leqq p;\ i{+}{+})\ \{$ $$k_i = \left[R(i) - \sum_{j=1}^{i-1} a_j^{(i-1)} R(i-j)\right] \Big/ E_{i-1};$$

-continued $$a_i^{(i)} = k_i;$$

$$\text{for}(j = 1;\ j < i;\ j{+}{+})\ a_j^{(i)} = a_j^{(i-1)} - k_i a_{i-j}^{(i-1)};$$

$$E_i = (1 - k_i^2)E_{i-1};$$

```
G_i = E_0/E_i;
for(j = 1; j ≦ q; j++) {
    if (S_update(j)) {
        S_j++;
        if(G_i > T_j) S_update(j) = 0;
    }
}
}
```

In this example, listing (5) includes an implementation of task T300 as shown in FIG. 9B. FIG. 10 shows one example of a modification of the pseudocode listing in FIG. 7 that may be used to perform implementations of all of tasks T100, T200, and T300.

Figure 11:
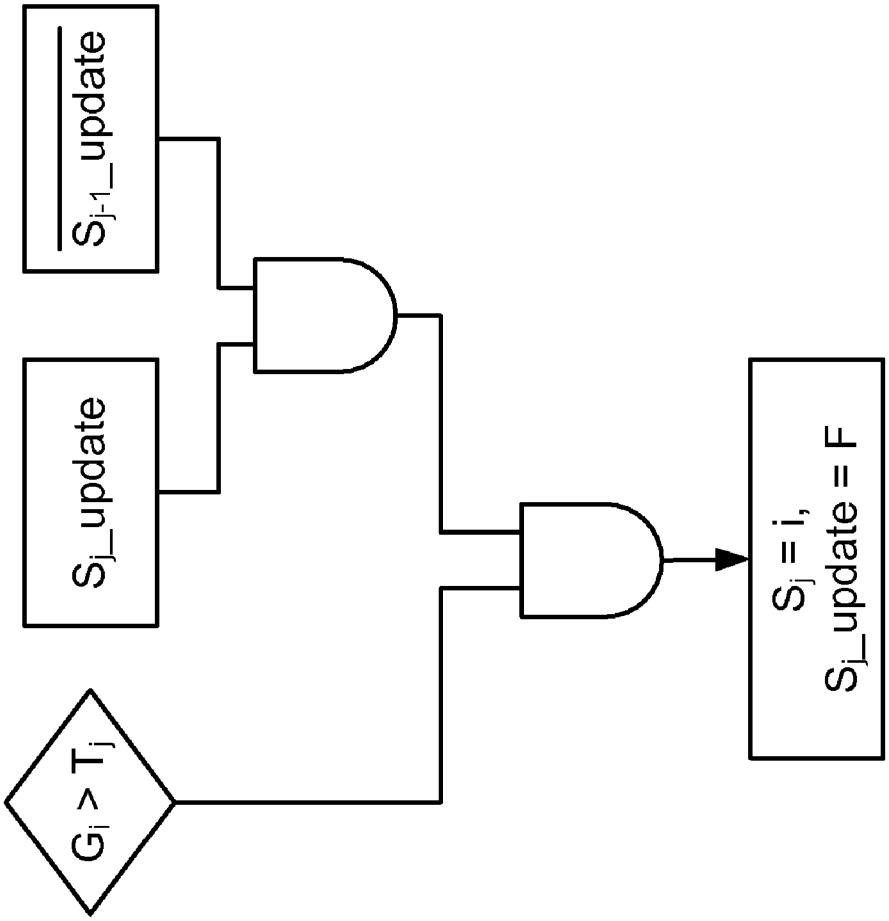
FIG. 11 shows an example of a logic module for task T300.

In some configurations, it may be desirable for task T300 to update a stop order only after the values of the stop orders preceding it have been fixed. For example, it may be desirable for different stop orders to have different values (e.g., except for stop orders having the default value). FIG. 11 shows one such example of a module that may be replicated in an alternate implementation of task T300 in which updating of a stop order is suspended until the value of the previous stop order has been fixed.

Figure 12:
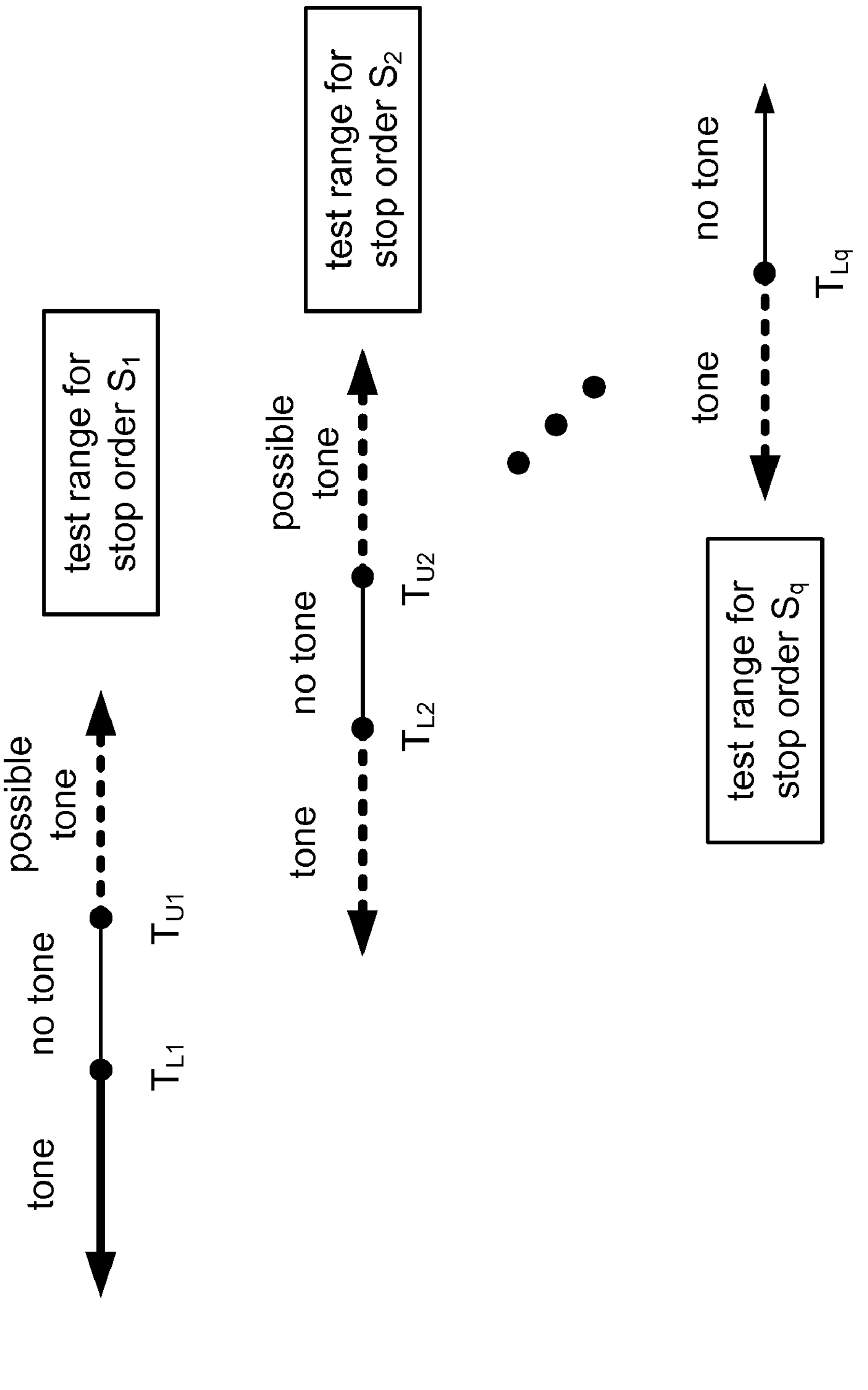
FIG. 12 shows an example of a test procedure for a configuration of task T400.
Figure 13:
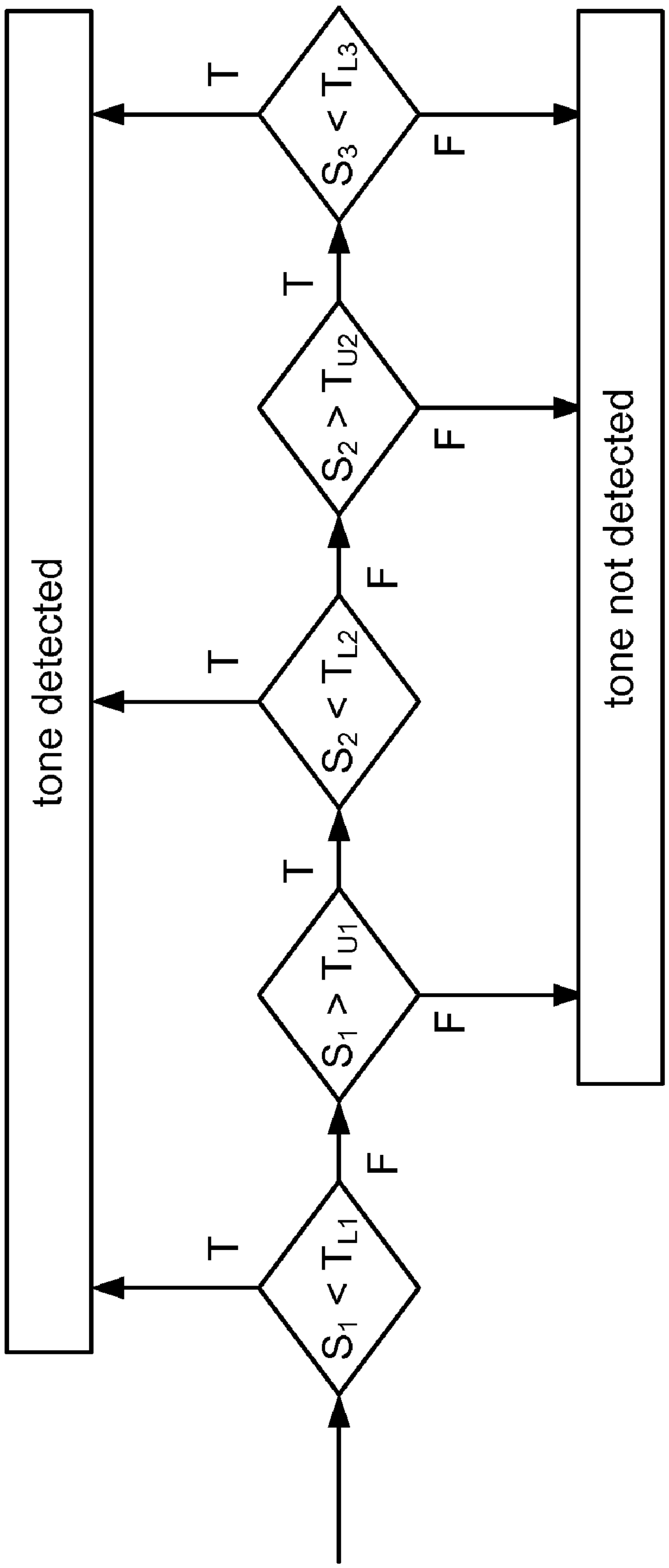
FIG. 13 shows a flowchart for an implementation of task T400.

Task T400 compares one or more of the stop orders to a threshold value. FIG. 12 shows an example of a test procedure for a configuration of task T400 that tests the stop orders sequentially in ascending order. In this example, task T400 compares each stop order $S_i$ to a corresponding pair of upper and lower thresholds (except for the last stop order $S_q$, which is tested against only a lower threshold in this particular example) until a decision as to the tonality of the portion in time is reached. FIG. 13 shows a flowchart for an implementation of task T400 that performs such a test procedure in a serial fashion for a case in which q is equal to three. In another example, one or more of the relations "<" in such a task is replaced with the relation "≦".

As shown in FIG. 12, a first possible test outcome is that the stop order has a value less than (alternatively, not greater than) the corresponding lower threshold. Such a result may indicate that more prediction gain was achieved at low iteration indices than would be expected for a speech signal. In this example, task T400 is configured to classify the portion in time as a tonal signal.

A second possible test outcome is that the stop order has a value between the lower and upper thresholds, which may indicate that the spectral energy distribution is typical of a speech signal. In this example, task T400 is configured to classify the portion in time as not tonal.

A third possible test outcome is that the stop order has a value greater than (alternatively, not less than) the corresponding upper threshold. Such a result may indicate that that less prediction gain was achieved at low iteration indices than would be expected for a speech signal. In this example, task T400 is configured to continue the test procedure to the next stop order in such a case.

Figure 14:
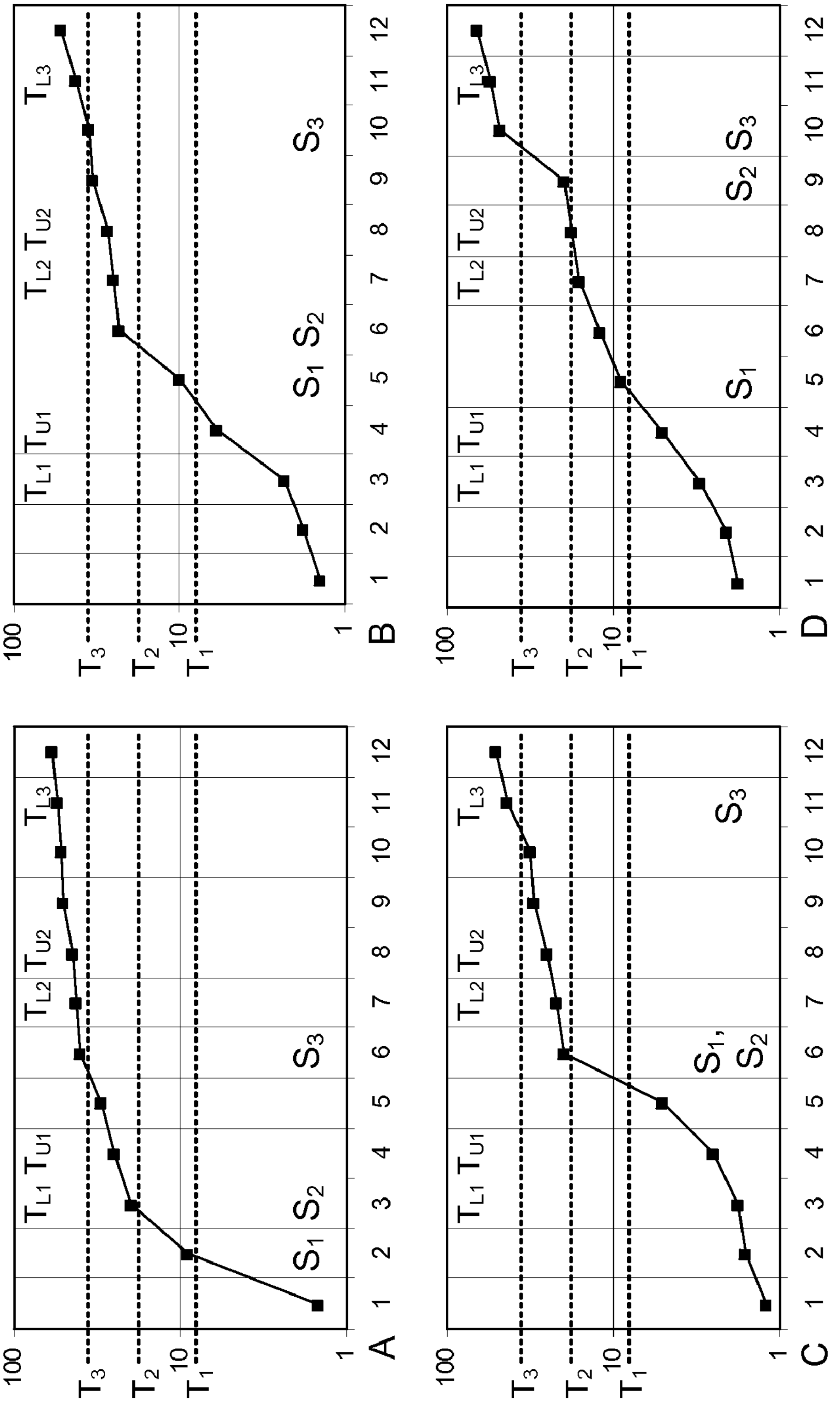
FIG. 14 shows plots of gain measure $G_i$ against iteration index i for four different examples A-D of portions in time.

FIG. 14 shows plots of gain measure $G_i$ against iteration index i for four different examples A-D of portions in time. In these plots, the vertical axis indicates the magnitude of gain measure $G_i$, the horizontal axis indicates the iteration index i, and p has the value 12. As indicated on the plots, in these examples the gain measure thresholds $T_1$, $T_2$, and $T_3$ are assigned the values 8, 19, and 34, respectively, and the stop order thresholds $T_{L1}$, $T_{U1}$, $T_{L2}$, $T_{U2}$, and $T_{L3}$ are assigned the values 3, 4, 7, 8, and 11, respectively. (In general, it is not necessary for $T_{Li}$ to be adjacent to $T_{Ui}$, or for $T_{Ui}$ to be less than $T_{L(i+1)}$, for any index i.)

Using these threshold values, all of the portions in time shown in plots A-D would be classified as tonal by the particular implementation of task T400 shown in FIG. 13. The portion in time of plot A would be classified as tonal because $S_1$ is less than $T_{L1}$. The portions in time of plots B and C would be classified as tonal because for both portions $S_1$ is greater than $T_{U1}$ and $S_2$ is less than $T_{L2}$. It is also noted that plot C shows an example in which two different stop orders have the same value. The portion in time of plot D would be classified as tonal because $S_1$ and $S_2$ are greater than $S_{U1}$ and $S_{U2}$, respectively, and $S_3$ is less than $T_{L3}$.

Figure 15:
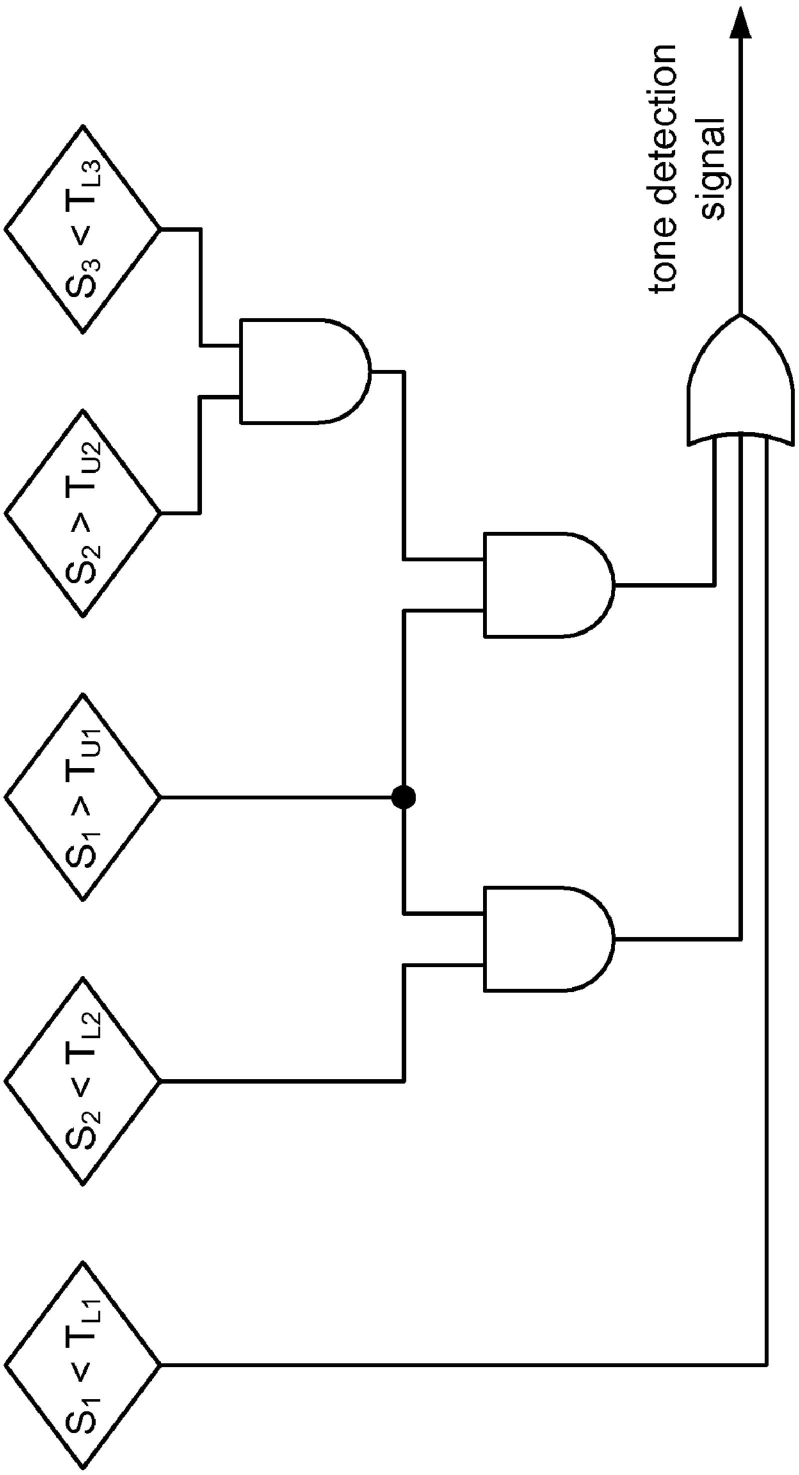
FIG. 15 shows an example of a logic structure for task T400.

FIG. 15 shows an example of a logic structure for task T400 in which the tests shown in FIG. 13 may be performed in parallel.

It may be appreciated that in the implementation of task T400 shown in FIG. 13, the test sequence terminates once a tonality decision has been made, even if only the first of the stop orders has been examined. The range of implementations of method M100 also includes configurations of task T400 in which the test sequence continues. In one such configuration, a portion in time is classified as tonal if any of the stop orders has a value less than (alternatively, not greater than) the corresponding lower threshold. In another such configuration, a portion in time is classified as tonal if a majority of the stop orders have values less than (alternatively, not greater than) the corresponding lower thresholds.

Figure 21:
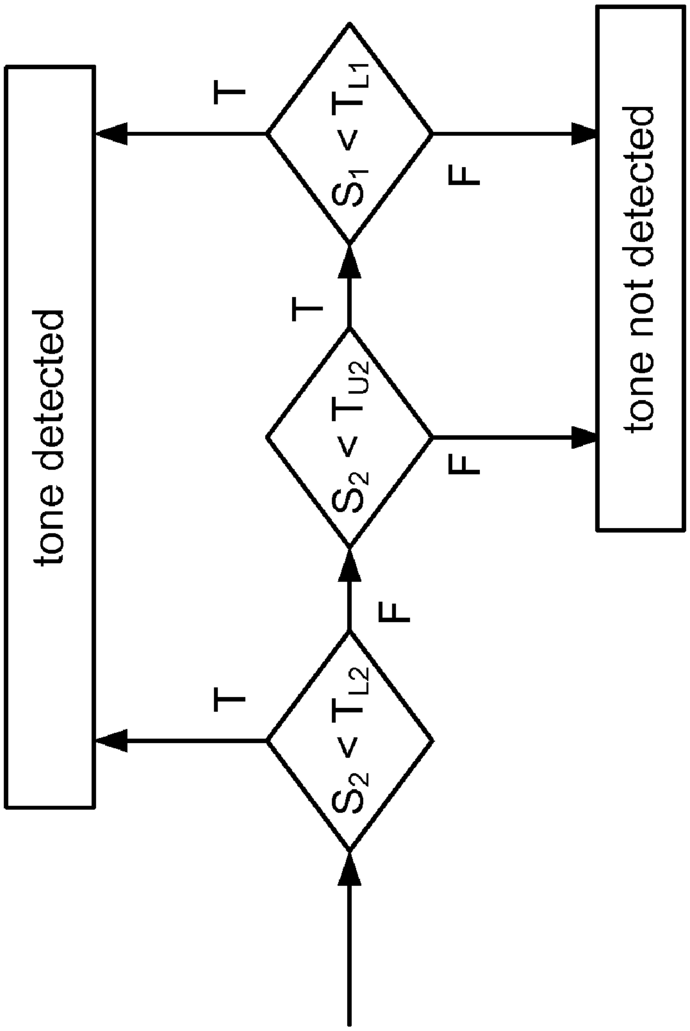
FIG. 21 shows a flowchart for another implementation of task T400.

FIG. 21 shows a flowchart for another implementation of task T400 that tests the stop orders sequentially in descending order. In this example, two stop orders are used (i.e., q=2). The range of particular values that may be used in such an implementation includes the set $T_1$=15 dB, $T_2$=30 dB, $T_{L1}$=4, $T_{L2}$=4, and $T_{U2}$=6. In another example, one or more of the relations "<" in such a task is replaced with the relation "≦".

Figure 22:
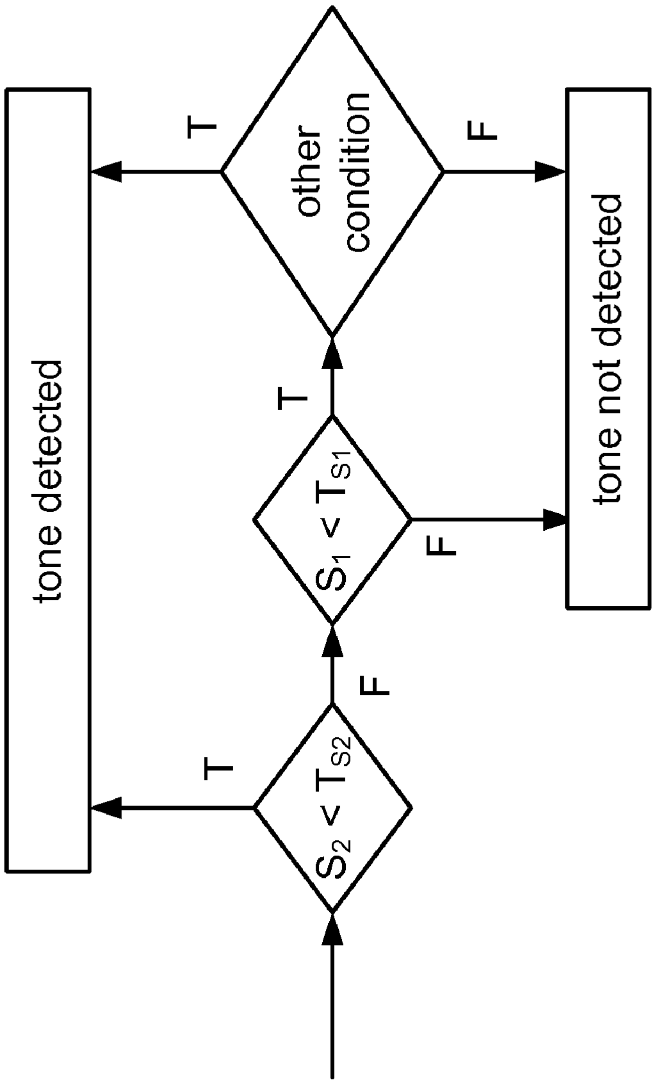
FIG. 22 shows a flowchart for a further implementation of task T400.

FIG. 22 shows a flowchart for a further implementation of task T400 that tests the stop orders sequentially in descending order, with each stop order $S_q$ being compared to one corresponding threshold $T_{Sq}$. In this example, two stop orders are used (i.e., q=2). The range of particular values that may be used in such an implementation includes the set $T_1$=15 dB, $T_2$=30 dB, $T_{S1}$=4, and $T_{S2}$=4. In another example, one or more of the relations "<" in such a task is replaced with the relation "≦".

This implementation also illustrates a case in which the outcome of task T400 may be contingent on one or more other conditions. Examples of such conditions include one or more qualities of the portion in time, such as the state of a relation between the spectral tilt (i.e., the first reflection coefficient) of the portion in time and a threshold value. Examples of such conditions also include one or more histories of the signal, such as the outcome of task T400 for one or more of the previous portions in time.

As shown in FIGS. 3 and 5, task T400 may be configured to execute after the series of iterations is completed. However, the contemplated range of implementations of method M100 also includes implementations that are configured to perform task T400 whenever a stop order is updated and implementations that are configured to perform task T400 at each iteration.

The range of implementations of method M100 also includes implementations that are configured to perform one or more acts in response to the outcome of task T400. For example, it may be desirable to truncate or otherwise terminate a LP or other speech coding operation when the frame being coded is tonal. As noted above, the high spectral peaks of a tonal signal may cause instability in an LPC filter, and conversion of the LPC coefficients to another form for transmission (such as line spectral pairs, line spectral frequencies, or immittance spectral pairs) may also suffer if the signal is peaky.

Some implementations of method M100 are configured to truncate the LPC analysis according to the iteration index i indicated by the stop order at which the tonality classification was reached in task T400. For example, such a method may be configured to reduce the magnitudes of the LPC coefficients (e.g., filter coefficients) for index i and above by, for example, assigning values of zero to those coefficients. Such truncation may be performed after the series of iterations has completed. Alternatively, for such an implementation in which task T400 is performed at each iteration or whenever a stop order is updated, such truncation may include terminating the series of iterations of task T100 before the p-th iteration is reached.

As noted above, other implementations of method M100 may be configured to select a suitable coding mode and/or rate based on the outcome of task T400. A general-purpose coding mode, such as a code-excited linear prediction (CELP) or a sinusoidal coding mode, may pass any waveform alike. Therefore, one way to transfer the tone satisfactorily to the decoder is to force the coder to use such a coding mode (e.g., full-rate CELP). A modern speech coder typically applies several criteria in determining how each frame is to be coded (such as rate limits), such that forcing a particular coding mode may require overriding a lot of other decisions.

The range of implementations of method M100 also includes implementations having tasks that are configured to identify the frequency or type of the tone or tones. In such case, it may be desirable to use a special coding mode to send that information rather than to code the portion in time. Such a method may begin execution of a frequency identification task (e.g., as opposed to continuing a speech coding procedure for that frame) based on the outcome of task T400. For example, an array of notch filters may be used to identify the frequencies of each of one or more of the strongest frequency components of the portion in time. Such a filter may be configured to divide the frequency spectrum (or some portion thereof) into bins of having a width of, for example, 100 Hz or 200 Hz. The frequency identification task may examine the entire spectrum of the portion in time or, alternatively, only selected frequency regions or bins (such as regions that include the frequencies of common signaling tones such as DTMF signals).

In a case where the two tones of a DTMF signal are identified, it may be desirable to use a special coding mode to transmit a digit corresponding to the identified DTMF signal, rather than the tones themselves or an identification of the actual frequencies. The frequency identification task may also be configured to detect the duration of each of one or more tones, which information may be transmitted to the decoder. A speech encoder performing such an implementation of method M100 may also be configured to transmit information such as tone frequency, amplitude, and/or duration to a decoder over a side channel of a transmission channel scheme, such as a data or signaling channel, rather than over a traffic channel.

Figure 16B:
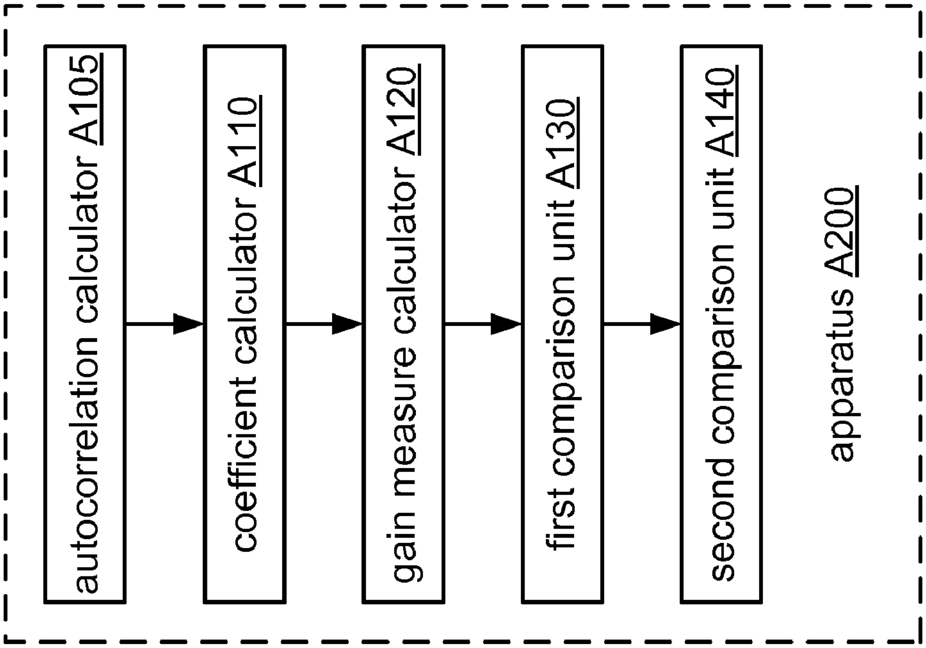
FIG. 16B shows a block diagram of an implementation A200 of apparatus A100.
Figure 16A:
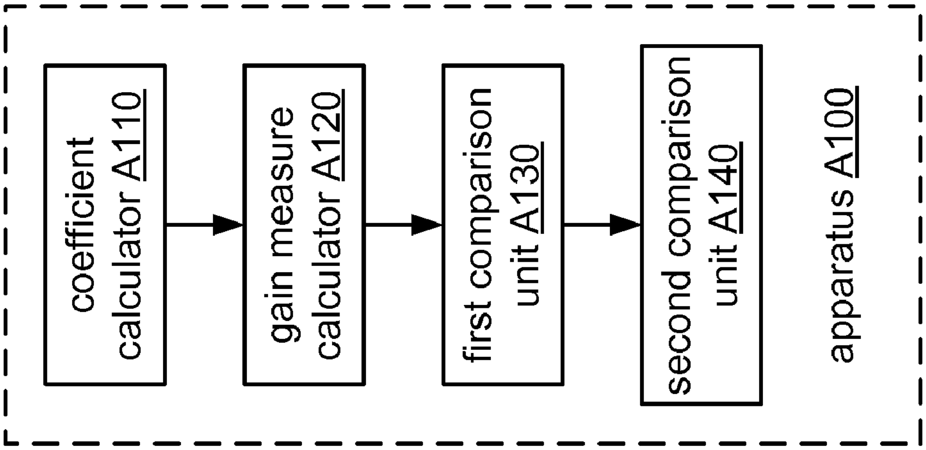
FIG. 16A shows a block diagram of an apparatus A100 according to a disclosed configuration.

Method M100 may be used in the context of a speech coder or may be applied independently (for example, to provide tone detection in a device other than a speech coder). FIG. 16A shows a block diagram of an apparatus A100 according to a disclosed configuration that may also be used in a speech coder, as a tone detector, and/or as part of another device or system.

Apparatus A100 includes a coefficient calculator A110 that is configured to perform an iterative coding operation to calculate a plurality of coefficients (e.g., filter coefficients and/or reflection coefficients) from a portion in time of a digitized audio signal. For example, coefficient calculator A110 may be configured to perform an implementation of task T100 as described herein.

Coefficient calculator A110 may be configured to perform the iterative coding operation according to an autocorrelation method as described herein. FIG. 16B shows a block diagram of an implementation A200 of apparatus A100 that also includes an autocorrelation calculator A105 configured to calculate autocorrelation values of the portion in time. Autocorrelation calculator A105 may also be configured to perform spectral smoothing of the autocorrelation values as described herein.

Apparatus A100 includes a gain measure calculator A120 configured to calculate, at each of the ordered plurality of iterations, a value of a measure relating to a gain of the coding operation. The value of the gain measure may be a prediction gain or a prediction error. The value of the gain measure may be calculated based on a ratio between a measure of the energy of the portion in time and a measure of the residual energy at the iteration. For example, gain measure calculator A120 may be configured to perform an implementation of task T200 as described herein.

Apparatus A100 also includes a first comparison unit A130 configured to store an indication of the iteration, among the ordered plurality, at which a change occurs in a state of a first relation between the calculated value and a first threshold value. The indication of the iteration may be implemented as a stop order, and first comparison unit A130 may be configured to update one or more stop orders. For example, first comparison unit A130 may be configured to perform an implementation of task T300 as described herein.

Apparatus A100 also includes a second comparison unit A140 configured to compare the stored indication to a second threshold value. Second comparison unit A140 may be configured to classify the portion in time as either tonal or not tonal based on a result of the comparison. For example, second comparison unit A140 may be configured to perform an implementation of task T400 as described herein. A further implementation of apparatus A100 includes an implementation of mode selector 202 as described below which is configured to select a coding mode and/or coding rate based on the output of second comparison unit A140.

The various elements of implementations of apparatus A100 may be implemented as electronic and/or optical devices residing, for example, on the same chip or among two or more chips in a chipset, although other arrangements without such limitation are also contemplated. One or more elements of such an apparatus may be implemented in whole or in part as one or more sets of instructions arranged to execute on one or more fixed or programmable arrays of logic elements (e.g., transistors, gates) such as microprocessors, embedded processors, IP cores, digital signal processors, FPGAs (field-programmable gate arrays), ASSPs (application-specific standard products), and ASICs (application-specific integrated circuits).

It is possible for one or more elements of an implementation of apparatus A100 to be used to perform tasks or execute other sets of instructions that are not directly related to an operation of the apparatus, such as a task relating to another operation of a device or system in which the apparatus is embedded. It is also possible for one or more elements of an implementation of apparatus A100 to have structure in common (e.g., a processor used to execute portions of code corresponding to different elements at different times, a set of instructions executed to perform tasks corresponding to different elements at different times, or an arrangement of electronic and/or optical devices performing operations for different elements at different times). As shown in pseudocode listings (4) and (5) above and the pseudocode listings of FIGS. 7 and 10, for example, one or more elements of an implementation of apparatus A100 may even be implemented as different portions of the same loop.

The configurations described above may be used in one or more devices (e.g., speech encoders) of a wireless telephony communication system configured to employ a CDMA (code-division multiple-access) over-the-air interface. Nevertheless, it would be understood by those skilled in the art that methods and apparatus including features as described herein may reside in any of various communication systems employing a wide range of technologies known to those of skill in the art. For example, one of skill in the art will appreciate that methods and apparatus as described above may be applied to any digital communication system, regardless of the particular physical and/or logical transmission scheme, and regardless of whether such a system is wired and/or wireless, circuit-switched and/or packet-switched, etc., and the use of these methods and/or apparatus with such systems is expressly contemplated and disclosed.

Figure 17:
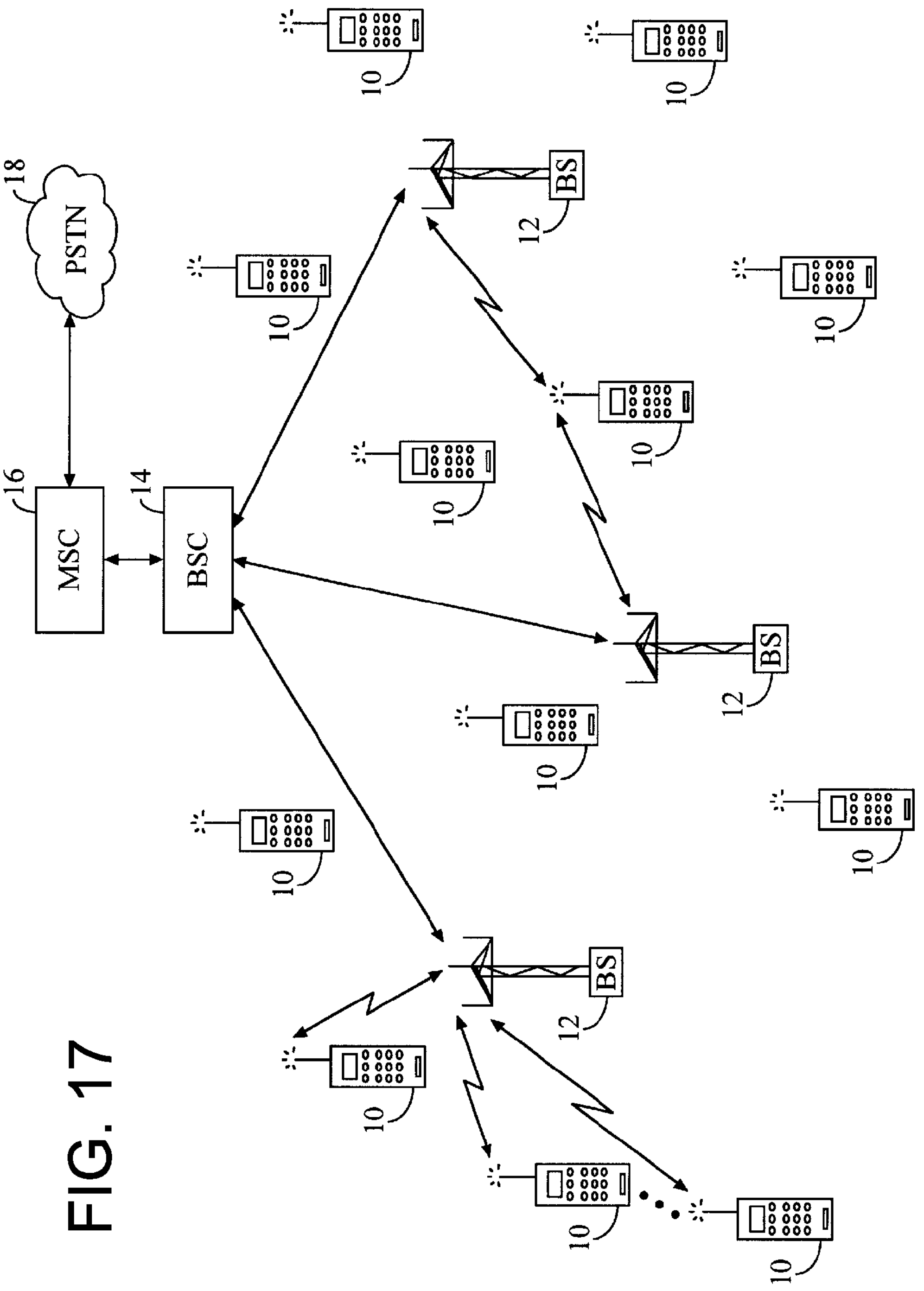
FIG. 17 shows a diagram of a system for cellular telephony.

As illustrated in FIG. 17, a system for cellular telephony generally includes a plurality of mobile subscriber units 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. In a CDMA system, the intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10. Such a system may be configured for use in accordance with the IS-95 standard or another CDMA standard. Such a system may also be configured to carry voice traffic via one or more packet-switched protocols, such as VoIP.

During typical operation of the cellular telephone system, the base stations 12 receive sets of reverse link signals from sets of mobile units 10. The mobile units 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile units 10.

Figure 18:
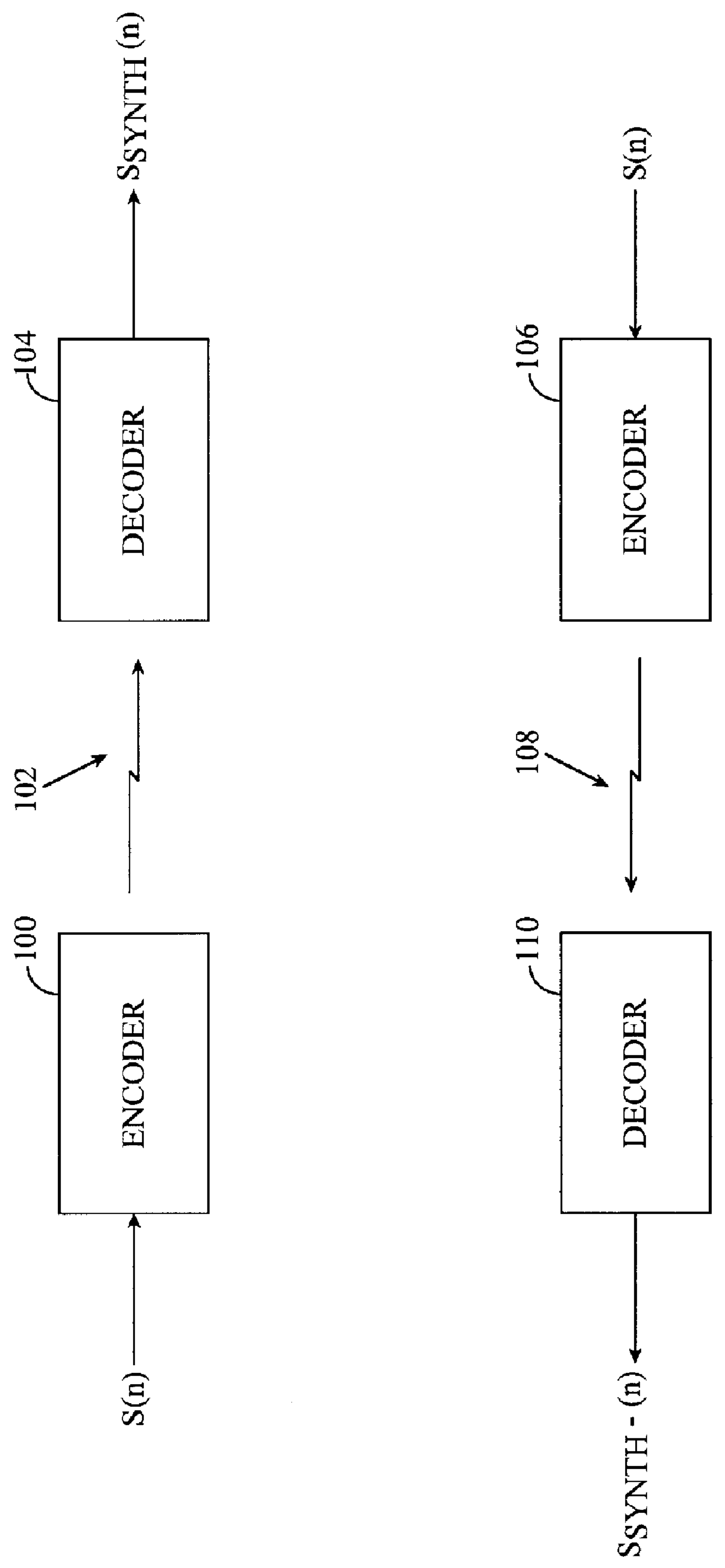
FIG. 18 shows a diagram of a system including two encoders and two decoders.

FIG. 18 shows a diagram of a system including two encoders 100, 106 that may be configured to perform an implementation of task T400 as disclosed herein and/or may be configured to include an implementation of apparatus A100 as disclosed herein. The first encoder 100 receives digitized speech samples s(n) and encodes the samples s(n) for transmission on a transmission medium and/or communication channel 102, to a first decoder 104. The decoder 104 decodes the encoded speech samples and synthesizes an output speech signal sSYNTH(n). For transmission in the opposite direction, a second encoder 106 encodes digitized speech samples s(n), which are transmitted on a transmission medium and/or communication channel 108. A second decoder 110 receives and decodes the encoded speech samples, generating a synthesized output speech signal sSYNTH(n). Encoder 100 and decoder 110 may be implemented together within a transceiver such as a cellular telephone. Likewise, encoder 106 and decoder 104 may be implemented together within a transceiver such as a cellular telephone.

The speech samples s(n) represent speech signals that have been digitized and quantized in accordance with any of various methods known in the art including, e.g., pulse code modulation (PCM), companded μ-law, or A-law. As known in the art, the speech samples s(n) are organized into frames of input data wherein each frame comprises a predetermined number of digitized speech samples s(n). In an exemplary configuration, a sampling rate of 8 kHz is employed, with each 20-millisecond frame comprising 160 samples. In the configurations described below, the rate of data transmission may advantageously be varied on a frame-to-frame basis between full rate, half rate, quarter rate, and eighth rate (corresponding in one example to 13.2, 6.2, 2.6, and 1 kbps, respectively). Varying the data transmission rate is potentially advantageous in that lower bit rates may be selectively employed for frames containing relatively less speech information. As understood by those skilled in the art, other sampling rates, frame sizes, and data transmission rates may be used.

The first encoder 100 and the second decoder 110 together comprise a first speech coder, or speech codec. The speech coder may be configured for use in any type of communication device for transmitting speech signals via a wired and/or wireless channel, including, e.g., the subscriber units, BTSs, or BSCs described above with reference to FIG. 17. Similarly, the second encoder 106 and the first decoder 104 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of writable storage medium known in the art. Alternatively, any conventional processor, controller, or state machine could be substituted for the microprocessor. Exemplary ASICs designed specifically for speech coding are described in U.S. Pat. No. 5,727,123 (McDonough et al., issued Mar. 10, 1998) and U.S. Pat. No. 5,784,532 (McDonough et al., issued Jul. 21, 1998).

Figure 19A:
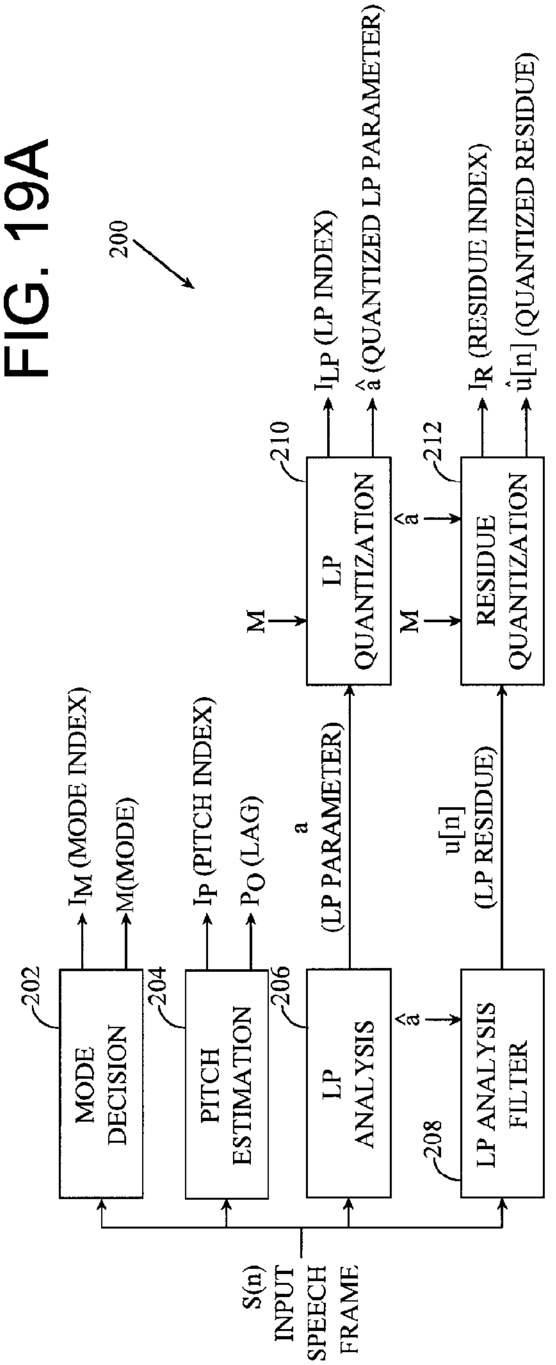
FIG. 19A shows a block diagram of an encoder.

In FIG. 19A an encoder 200 that may be used in a speech coder includes a mode selector 202, a pitch estimation module 204, an LP analysis module 206, an LP analysis filter 208, an LP quantization module 210, and a residue quantization module 212. Input speech frames s(n) are provided to the mode selector 202, the pitch estimation module 204, the LP analysis module 206, and the LP analysis filter 208. The mode selector 202 produces a mode indication M based upon the periodicity, energy, signal-to-noise ratio (SNR), or zero crossing rate, among other features, of each input speech frame s(n). Mode selector 202 may also be configured to produce the mode indication M based on an outcome of task T400, and/or an output of second comparison unit A140, corresponding to detection of a tonal signal.

Mode M may indicate a coding mode such as CELP, NELP, or PPP as disclosed herein and may also indicate a coding rate. In the example shown in FIG. 19A, mode selector 202 also produces a mode index $I_M$ (e.g., an encoded version of mode indication M for transmission). Various methods of classifying speech frames according to periodicity are described in U.S. Pat. No. 5,911,128 (DeJaco, issued Jun. 8, 1999). Such methods are also incorporated into the Telecommunication Industry Association Industry Interim Standards TIA/EIA IS-127 and TIA/EIA IS-733. An exemplary mode decision scheme is also described in U.S. Pat. No. 6,691,084 (Manjunath et al., issued Feb. 10, 2004).

The pitch estimation module 204 produces a pitch index $I_P$ and a lag value $P_0$ based upon each input speech frame s(n). The LP analysis module 206 performs linear predictive analysis on each input speech frame s(n) to generate a set of LP parameters (e.g., filter coefficients a). The LP parameters are received by the LP quantization module 210, possibly after conversion to another form such as LSPs, LSFs, or LSPs (alternatively, such conversion may occur within module 210). In this example, the LP quantization module 210 also receives the mode indication M, thereby performing the quantization process in a mode-dependent manner.

The LP quantization module 210 produces an LP index $I_{LP}$ (e.g., an index into a quantization codebook) and a quantized set of LP parameters â. The LP analysis filter 208 receives the quantized set of LP parameters â in addition to the input speech frame s(n). The LP analysis filter 208 generates an LP residue signal u[n], which represents the error between the input speech frames s(n) and the reconstructed speech based on the quantized linear predicted parameters â. The LP residue u[n] and the mode indication M are provided to the residue quantization module 212. In this example, the quantized set of LP parameters â are also provided to the residue quantization module 212. Based upon these values, the residue quantization module 212 produces a residue index $I_R$ and a quantized residue signal û[n]. Each of the encoders 100 and 106 as shown in FIG. 18 may be configured to include an implementation of encoder 200 together with an implementation of apparatus A100.

Figure 19B:
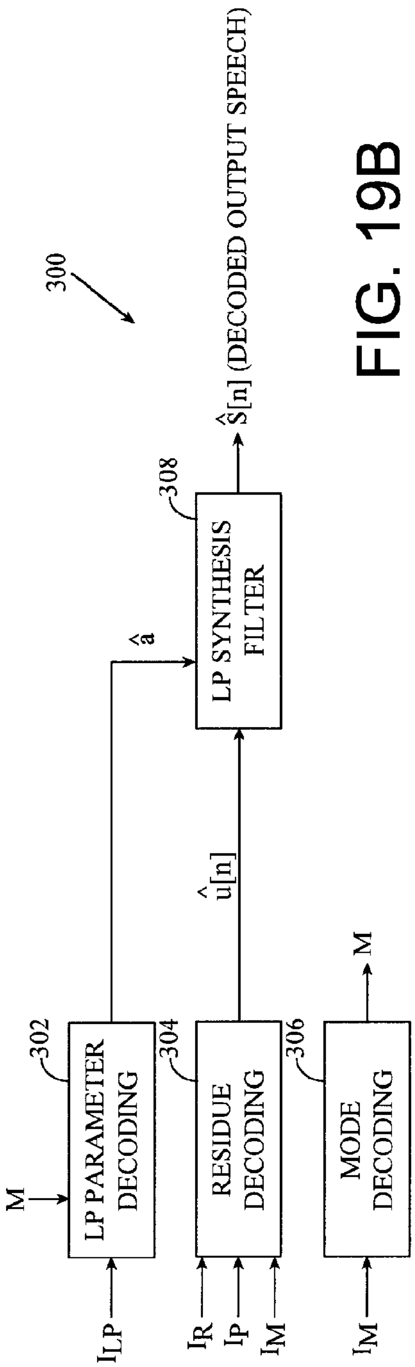
FIG. 19B shows a block diagram of a decoder.

In FIG. 19B a decoder 300 that may be used in a speech coder includes an LP parameter decoding module 302, a residue decoding module 304, a mode decoding module 306, and an LP synthesis filter 308. The mode decoding module 306 receives and decodes a mode index $I_M$, generating therefrom a mode indication M. The LP parameter decoding module 302 receives the mode M and an LP index $I_{LP}$. The LP parameter decoding module 302 decodes the received values to produce a quantized set of LP parameters â. The residue decoding module 304 receives a residue index $I_R$, a pitch index $I_P$, and the mode index $I_M$. The residue decoding module 304 decodes the received values to generate a quantized residue signal û[n]. The quantized residue signal û[n] and the quantized set of LP parameters â are received by the LP synthesis filter 308, which synthesizes a decoded output speech signal ŝ[n] therefrom. Each of the decoders 104 and 110 as shown in FIG. 18 may be configured to include an implementation of decoder 300.

Figure 20:
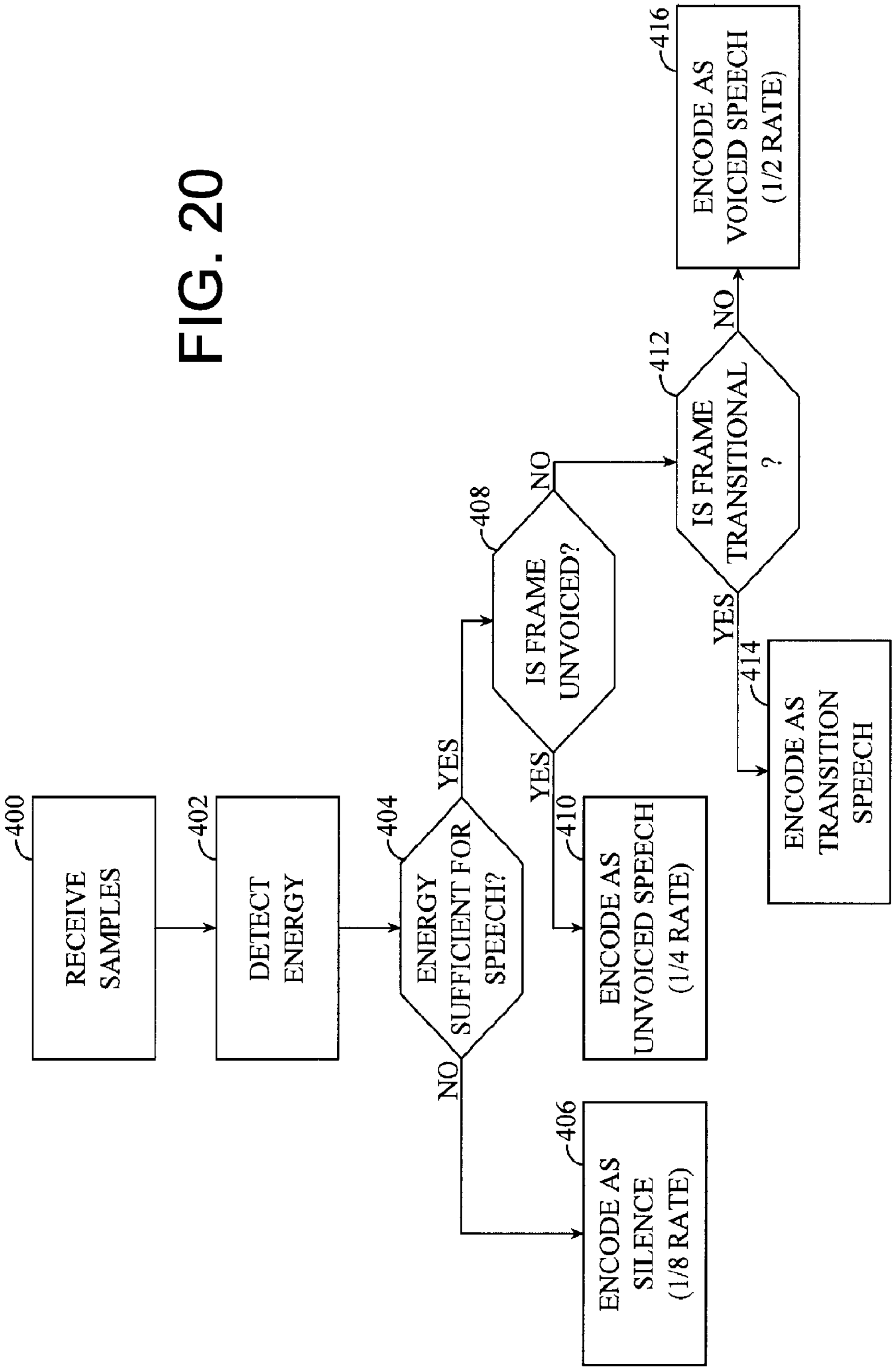
FIG. 20 shows a flowchart of tasks for mode selection.

FIG. 20 shows a flowchart of tasks for mode selection that may be performed by a speech coder including an implementation of mode selector 202. In task 400, the mode selector receives digital samples of a speech signal in successive frames. Upon receiving a given frame, the mode selector proceeds to task 402. In task 402, the mode selector detects the energy of the frame. The energy is a measure of the speech activity of the frame. Speech detection is performed by summing the squares of the amplitudes of the digitized speech samples and comparing the resultant energy against a threshold value. Task 402 may be configured to adapt this threshold value based on the changing level of background noise. An exemplary variable threshold speech activity detector is described in the aforementioned U.S. Pat. No. 5,414,796. Some unvoiced speech sounds can be extremely low-energy samples that may be mistakenly encoded as background noise. To reduce the chance of such an error, the spectral tilt (e.g., the first reflection coefficient) of low-energy samples may be used to distinguish the unvoiced speech from background noise, as described in the aforementioned U.S. Pat. No. 5,414,796.

After detecting the energy of the frame, the mode selector proceeds to task 404. (An alternative implementation of mode selector 202 is configured to receive the frame energy from another element of the speech coder.) In task 404, the mode selector determines whether the detected frame energy is sufficient to classify the frame as containing speech information. If the detected frame energy falls below a predefined threshold level, the speech coder proceeds to task 406. In task 406, the speech coder encodes the frame as background noise (i.e., silence). In one configuration the background noise frame is encoded at ⅛ rate (e.g., 1 kbps). If in task 404, the detected frame energy meets or exceeds the predefined threshold level, the frame is classified as speech and the mode selector proceeds to task 408.

In task 408, the mode selector determines whether the frame is unvoiced speech. For example, task 408 may be configured to examine the periodicity of the frame. Various known methods of periodicity determination include, e.g., the use of zero crossings and the use of normalized autocorrelation functions (NACFs). In particular, using zero crossings and NACFs to detect periodicity is described in the aforementioned U.S. Pat. Nos. 5,911,128 and 6,691,084. In addition, the above methods used to distinguish voiced speech from unvoiced speech are incorporated into the Telecommunication Industry Association Interim Standards TIA/EIA IS-127 and TIA/EIA IS-733. If the frame is determined to be unvoiced speech in task 408, the speech coder proceeds to task 410. In task 410, the speech coder encodes the frame as unvoiced speech. In one configuration, unvoiced speech frames are encoded at quarter rate (e.g., 2.6 kbps). If the frame is not determined to be unvoiced speech in task 408, the mode selector proceeds to task 412.

In task 412, the mode selector determines whether the frame is transitional speech. Task 412 may be configured to use periodicity detection methods that are known in the art (for example, as described in the aforementioned U.S. Pat. No. 5,911,128). If the frame is determined to be transitional speech, the speech coder proceeds to task 414. In task 414, the frame is encoded as transition speech (i.e., transition from unvoiced speech to voiced speech). In one configuration, the transition speech frame is encoded in accordance with a multipulse interpolative coding method described in U.S. Pat. No. 6,260,017 (Das et al., issued Jul. 10, 2001). A CELP mode may also be used to encode transition speech frames. In another configuration, the transition speech frame is encoded at full rate (e.g., 13.2 kbps).

If in task 412, the mode selector determines that the frame is not transitional speech, the speech coder proceeds to task 416. In task 416, the speech coder encodes the frame as voiced speech. In one configuration, voiced speech frames may be encoded at half rate (e.g., 6.2 kbps), or at quarter rate, using a PPP coding mode. It is also possible to encode voiced speech frames at full rate using a PPP or other coding mode (e.g., 13.2 kbps, or 8 kbps in an 8 k CELP coder). Those skilled in the art would appreciate, however, that coding voiced frames at half or quarter rate allows the coder to save valuable bandwidth by exploiting the steady-state nature of voiced frames. Further, regardless of the rate used to encode the voiced speech, the voiced speech is advantageously coded using information from past frames.

The above description of a multimode speech codec describes the processing of an input frame containing speech. Note that a classification process for the contents of the frame is used in order to select a best mode by which to encode the frame. Several encoder/decoder modes are described in the following sections. The different encoder/decoder modes operate according to different coding modes. Certain modes are more effective at coding portions of the speech signal s(n) exhibiting certain properties. As noted above, mode selector 202 may be configured to override a coding decision as is shown in FIG. 20 (e.g., as produced by task 408 and/or 412), based on the outcome of task T400 and/or an output of second comparison unit A140.

In one configuration, a "Code Excited Linear Predictive" (CELP) mode is chosen to code frames classified as transient speech. The CELP mode excites a linear predictive vocal tract model with a quantized version of the linear prediction residual signal. Of all the encoder/decoder modes described herein, CELP generally produces the most accurate speech reproduction but requires the highest bit rate. In one configuration, the CELP mode performs encoding at 8500 bits per second. In another configuration, CELP encoding of a frame is performed at a selected one of a full rate and a half rate. A CELP mode may also be selected according to an outcome of task T400, and/or an output of second comparison unit A140, corresponding to detection of a tonal signal.

A "Prototype Pitch Period" (PPP) mode may be chosen to code frames classified as voiced speech. Voiced speech contains slowly time varying periodic components which are exploited by the PPP mode. The PPP mode codes only a subset of the pitch periods within each frame. The remaining periods of the speech signal are reconstructed by interpolating between these prototype periods. By exploiting the periodicity of voiced speech, PPP is able to achieve a lower bit rate than CELP and still reproduce the speech signal in a perceptually accurate manner. In one configuration, the PPP mode performs encoding at 3900 bits per second. In another configuration, PPP encoding of a frame is performed at a selected one of a full rate, a half rate, and a quarter rate. A "Waveform Interpolation" (WI) or "Prototype Waveform Interpolation" (PWI) mode may also be used to code frames classified as voiced speech.

A "Noise Excited Linear Predictive" (NELP) mode may be chosen to code frames classified as unvoiced speech. NELP uses a filtered pseudo-random noise signal to model unvoiced speech. NELP uses the simplest model for the coded speech, and therefore achieves the lowest bit rate. In one configuration, the NELP mode performs encoding at 1500 bits per second. In another configuration, NELP encoding of a frame is performed at a selected one of a half rate and a quarter rate.

The same coding technique can frequently be operated at different bit rates, with varying levels of performance. The different encoder/decoder modes can therefore represent different coding techniques, or the same coding technique operating at different bit rates, or combinations of the above. Skilled artisans will recognize that increasing the number of encoder/decoder modes will allow greater flexibility when choosing a mode, which can result in a lower average bit rate, but will increase complexity within the overall system. The particular combination used in any given system will be dictated by the available system resources and the specific signal environment. A speech coder or other apparatus performing an implementation of task T400 as disclosed herein, and/or including an implementation of apparatus A100 as disclosed herein, may be configured to select a particular coding rate (e.g., full rate or half rate) according to an outcome of task T400, and/or an output of second comparison unit A140, that indicates detection of a tonal signal.

The foregoing presentation of the described configurations is provided to enable any person skilled in the art to make or use the methods and other structures disclosed herein. The flowcharts and other structures shown and described herein are examples only, and other variants of these structures are also within the scope of the disclosure. Various modifications to these configurations are possible, and the generic principles presented herein may be applied to other configurations as well.

Each of the configurations described herein may be implemented in part or in whole as a hard-wired circuit, as a circuit configuration fabricated into an application-specific integrated circuit, or as a firmware program loaded into non-volatile storage or a software program loaded from or into a data storage medium (e.g., a non-transitory data storage medium) as machine-readable code, such code being instructions executable by an array of logic elements such as a microprocessor or other digital signal processing unit. The non-transitory data storage medium may be an array of storage elements such as semiconductor memory (which may include without limitation dynamic or static RAM (random-access memory), ROM (read-only memory), and/or flash RAM), or ferroelectric, magnetoresistive, ovonic, polymeric, or phase-change memory; or a disk medium such as a magnetic or optical disk. The term "software" should be understood to include source code, assembly language code, machine code, binary code, firmware, macrocode, microcode, any one or more sets or sequences of instructions executable by an array of logic elements, and any combination of such examples.

Each of the methods disclosed herein may also be tangibly embodied (for example, in one or more data storage media as listed above) as one or more sets of instructions readable and/or executable by a machine including an array of logic elements (e.g., a processor, microprocessor, microcontroller, or other finite state machine). Thus, the present disclosure is not intended to be limited to the configurations shown above but rather is to be accorded the widest scope consistent with the principles and novel features disclosed in any fashion herein, including in the attached claims as filed, which form a part of the original disclosure.

What is claimed is:

1. A method of signal processing, said method comprising:

performing a coding operation on a portion in time of a digitized audio signal, wherein said coding operation includes an ordered plurality of iterations;

for each of the ordered plurality of iterations, calculating a corresponding value of a gain measure for the coding operation, wherein the value is based on a calculated energy of a residue of the iteration of the coding operation;

for each of a plurality of first threshold values, determining the first iteration, among the ordered plurality, at which a specified relation between the corresponding calculated gain measure value and the threshold value has a particular state, and storing an indication of the position of the iteration within the ordered plurality; and comparing at least one of the stored order indications to at least one corresponding second threshold value, wherein said gain measure for the coding operation is a monotone function with respect to the position of the iteration within the ordered plurality.

2. The method of signal processing according to claim 1, wherein said comparing at least one of the stored indications to at least one corresponding threshold value includes, for each of a plurality of the stored indications, comparing the stored indication to a corresponding one of a second plurality of second threshold values.

3. The method of signal processing according to claim 1, wherein the coding operation is a linear predictive coding operation, and wherein each of the ordered plurality of iterations calculates a corresponding one of an ordered plurality of reflection coefficients that relates to the portion in time.

4. The method of signal processing according to claim 3, wherein each of the second through last of the ordered plurality of iterations is configured to calculate the corresponding reflection coefficient based on the reflection coefficient calculated in the previous iteration.

5. The method of signal processing according to claim 3, wherein said calculating a corresponding value of a gain measure for the coding operation includes calculating the value based on a square of the corresponding reflection coefficient.

6. The method of signal processing according to claim 1, wherein said coding operation is a linear predictive coding operation, and wherein each of the ordered plurality of iterations calculates a corresponding one of an ordered plurality of filter coefficients relating to the portion in time.

7. The method of signal processing according to claim 6, said method comprising, in response to a result of said comparing, reducing the magnitude of at least the filter coefficient that corresponds to the last among the ordered plurality of iterations.

8. The method of signal processing according to claim 1, wherein the coding operation is a linear predictive coding operation, and wherein said gain measure for the coding operation is one among (A) a prediction gain of the linear predictive coding operation and (B) a prediction error of the linear predictive coding operation.

9. The method of signal processing according to claim 1, wherein said comparing at least one of the stored indications to at least one corresponding second threshold value includes comparing at least one of the stored indications to each of a corresponding upper second threshold value and a corresponding lower second threshold value.

10. The method of signal processing according to claim 1, wherein, for each of the ordered plurality of iterations, the corresponding value of the gain measure for the coding operation is based on a ratio between (A) energy of the portion in time and (B) said corresponding calculated energy of the residue.

11. The method according to claim 10, wherein at each of the ordered plurality of iterations after the first iteration, said energy of the residue of the iteration does not exceed said energy of the residue of the previous iteration.

12. The method of signal processing according to claim 1, wherein, for each of the plurality of first threshold values, the first relation between the calculated gain measure value and the threshold value has (A) a first state when the calculated gain measure value is greater than the threshold value and (B) a second state, different than the first state, when the calculated gain measure value is less than the threshold value.

13. The method of signal processing according to claim 1, said method comprising:

if a result of said comparing has a first state, selecting a full-rate coding mode for the portion in time in response to the result;

and if the result of said comparing has a second state different than the first state, selecting a half-rate coding mode for the portion in time in response to the result.

14. The method of signal processing according to claim 1, said method comprising:

if a result of said comparing has a first state, using at least one codebook index to encode an excitation signal of the portion in time in response to the result; and if the result of said comparing has a second state different than the first state, selecting a noise-excited coding mode for the portion in time in response to the result.

15. The method of signal processing according to claim 1, said method comprising, in response to a result of said comparing, identifying a dual-tone multifrequency signal included in the portion in time.

16. The method of signal processing according to claim 1, said method comprising, in response to a result of said comparing, determining a frequency of each of at least two frequency components of the portion in time.

17. The method of signal processing according to claim 1, said method comprising, based on at least one of the stored indications, deciding that the portion in time is one of (A) a speech signal and (B) a tonal signal, wherein said deciding includes said comparing at least one of the stored indications to at least one corresponding second threshold value.

18. A non-transitory data storage medium having machine-readable instructions describing the method according to claim 1.

19. The method according to claim 1, wherein said ordered plurality of iterations includes at least six iterations.

20. An apparatus for signal processing, said apparatus comprising:

means for performing a coding operation on a portion in time of a digitized audio signal, wherein said coding operation includes an ordered plurality of iterations;

means for calculating, for each of the ordered plurality of iterations, an energy of a residue remaining after the iteration;

means for calculating, for each of the ordered plurality of iterations, a corresponding value of a gain measure for the coding operation, wherein the value is based on said corresponding calculated energy of the residue;

means for determining, for each of a plurality of first threshold values, the first iteration among the ordered plurality at which a specified relation between (A) the calculated gain measure value corresponding to the iteration and (B) the threshold value has a particular state and for storing an indication of the position of the iteration within the ordered plurality; and means for comparing at least one of the stored indications to at least one corresponding second threshold value, wherein said gain measure for the coding operation is a monotone function with respect to the position of the iteration within the ordered plurality.

21. The apparatus for signal processing according to claim 20, wherein said means for comparing at least one of the stored indications to at least one corresponding threshold value is configured to compare each of a plurality of the stored indications to a corresponding one of a plurality of second threshold values.

22. The apparatus for signal processing according to claim 20, wherein the coding operation is a linear predictive coding operation, and wherein said gain measure for the coding operation is one among (A) a prediction gain of the linear predictive coding operation and (B) a prediction error of the linear predictive coding operation.

23. The apparatus for signal processing according to claim 20, wherein, for each of the ordered plurality of iterations, the corresponding value of the gain measure for the coding operation is based on a ratio between (A) energy of the portion in time and (B) said corresponding calculated energy of the residue.

24. The apparatus according to claim 23, wherein at each of the ordered plurality of iterations after the first iteration, said energy of the residue of the iteration does not exceed said energy of the residue of the previous iteration.

25. The apparatus for signal processing according to claim 20, wherein said means for comparing at least one of the stored indications to at least one corresponding second threshold value is configured to compare at least one of the stored indications to each of a corresponding upper second threshold value and a corresponding lower second threshold value.

26. The apparatus for signal processing according to claim 20, wherein, for each of the plurality of first threshold values, the first relation between the calculated gain measure value and the threshold value has (A) a first state when the calculated gain measure value is greater than the threshold value and (B) a second state, different than the first state, when the calculated gain measure value is less than the threshold value.

27. The apparatus for signal processing according to claim 20, said apparatus comprising means for selecting, if an output of said means for comparing has a first state, a full-rate coding mode for the portion in time, and for selecting a half-rate coding mode for the portion in time otherwise.

28. A cellular telephone including the apparatus according to claim 20 and configured to perform, based on an output of said means for comparing, at least one among (A) if an output of said means for comparing has a first state, selecting a full-rate coding mode for the portion in time, and selecting a half-rate coding mode for the portion in time otherwise and (B) among a plurality of filter coefficients, each corresponding to a different one of the ordered plurality of iterations, reducing a magnitude of at least the filter coefficient that corresponds to the last among the ordered plurality of iterations.

29. An apparatus for signal processing, said apparatus comprising:

a coefficient calculator configured to perform a coding operation to calculate a plurality of coefficients based on a portion in time of a digitized audio signal, wherein said coding operation includes an ordered plurality of iterations;

a residual energy calculator configured to calculate, for each of the ordered plurality of iterations, an energy of a residue remaining after the iteration;

a gain measure calculator configured to calculate, for each of the ordered plurality of iterations, a corresponding value of a gain measure for the coding operation, wherein the value is based on said corresponding calculated energy of the residue;

a first comparison unit configured to determine, for each of a plurality of first threshold values, the first iteration among the ordered plurality at which a specified relation between (A) the calculated gain measure value corresponding to the iteration and (B) the threshold value has a particular state and to store an indication of the position of the iteration within the ordered plurality; and a second comparison unit configured to compare at least one of the stored indications to at least one corresponding second threshold value, wherein said gain measure for the coding operation is a monotone function with respect to the position of the iteration within the ordered plurality.

30. The apparatus for signal processing according to claim 29, wherein said second comparison unit is configured to compare each of a plurality of the stored indications to a corresponding one of a plurality of second threshold values.

31. The apparatus for signal processing according to claim 29, wherein the coding operation is a linear predictive coding operation, and wherein said gain measure for the coding operation is one among (A) a prediction gain of the linear predictive coding operation and (B) a prediction error of the linear predictive coding operation.

32. The apparatus for signal processing according to claim 29, wherein, for each of the ordered plurality of iterations, the corresponding value of the gain measure for the coding operation is based on a ratio between (A) energy of the portion in time and (B) said corresponding calculated energy of the residue.

33. The apparatus according to claim 32, wherein at each of the ordered plurality of iterations after the first iteration, said energy of the residue of the iteration does not exceed said energy of the residue of the previous iteration.

34. The apparatus for signal processing according to claim 29, wherein said second comparison unit is configured to compare at least one of the stored indications to each of a corresponding upper second threshold value and a corresponding lower second threshold value.

35. The apparatus for signal processing according to claim 29, wherein, for each of the plurality of first threshold values, the first relation between the calculated gain measure value and the threshold value has (A) a first state when the calculated gain measure value is greater than the threshold value and (B) a second state, different than the first state, when the calculated gain measure value is less than the threshold value.

36. The apparatus for signal processing according to claim 29, said apparatus comprising a mode selector configured to select, if an output of said second comparison unit has a first state, a full-rate coding mode for the portion in time, and to select a half-rate coding mode for the portion in time otherwise.

37. A cellular telephone including the apparatus according to claim 29 and configured to perform, based on an output of said second comparison unit, at least one among (A) if an output of said second comparison unit has a first state, selecting a full-rate coding mode for the portion in time, and selecting a half-rate coding mode for the portion in time otherwise and (B) reducing a magnitude of at least one among the plurality of coefficients that corresponds to the last among the ordered plurality of iterations.

38. A speech encoder including the apparatus according to claim 29 and configured to perform, based on an output of said second comparison unit, at least one among (A) if an output of said second comparison unit has a first state, selecting a full-rate coding mode for the portion in time, and selecting a half-rate coding mode for the portion in time otherwise and (B) reducing a magnitude of at least one among the plurality of coefficients that corresponds to the last among the ordered plurality of iterations.

* * * * *